(12) United States Patent
Jin

(10) Patent No.: US 12,345,598 B2
(45) Date of Patent: Jul. 1, 2025

(54) BEARING DETECTION METHOD, BEARING DETECTION SYSTEM, METHOD FOR STARTING GAS TURBINE AND SYSTEM FOR STARTING GAS TURBINE

(71) Applicant: TxEGT AUTOMOTIVE POWERTRAIN TECHNOLOGY CO., LTD, Beijing (CN)

(72) Inventor: Pu Jin, Beijing (CN)

(73) Assignee: TxEGT AUTOMOTIVE POWERTRAIN TECHNOLOGY CO., LTD, Beijing (CN)

( * ) Notice: Subject to any disclaimer, the term of this patent is extended or adjusted under 35 U.S.C. 154(b) by 802 days.

(21) Appl. No.: 17/623,614

(22) PCT Filed: Dec. 11, 2020

(86) PCT No.: PCT/CN2020/135890
§ 371 (c)(1),
(2) Date: Dec. 29, 2021

(87) PCT Pub. No.: WO2021/129423
PCT Pub. Date: Jul. 1, 2021

(65) Prior Publication Data
US 2022/0260456 A1 Aug. 18, 2022

(30) Foreign Application Priority Data
Dec. 23, 2019 (CN) .................. 201911342263.X

(51) Int. Cl.
*G01M 13/04* (2019.01)
*F16C 32/04* (2006.01)

(52) U.S. Cl.
CPC ......... *G01M 13/04* (2013.01); *F16C 32/0442* (2013.01); *F16C 2233/00* (2013.01); *F16C 2360/23* (2013.01)

(58) Field of Classification Search
CPC .. G01M 13/04; G01M 99/004; G01M 99/007; F16C 32/0442; F16C 2233/00;
(Continued)

(56) References Cited

U.S. PATENT DOCUMENTS

2017/0067796 A1* 3/2017 Kawada ............. F16C 33/6637
2018/0091086 A1* 3/2018 Matsubara ............. H02P 31/00

FOREIGN PATENT DOCUMENTS

CN 107878442 A 4/2018
CN 108152740 A 6/2018
(Continued)

OTHER PUBLICATIONS

GB/T 27930-2015, Communication protocols between off-board conductive charger and battery management system for electric vehicle, 2015, General Administration of Quality Supervision, Inspection and Quarantine of the People's Republic of China; Standardization Administration of the People's Republic of China.

*Primary Examiner* — Matthew G Marini
*Assistant Examiner* — Leo T Hinze
(74) *Attorney, Agent, or Firm* — Bayramoglu Law Offices LLC

(57) ABSTRACT

Provided are a bearing detection method, a bearing detection system, a method for starting a gas turbine and a system for starting a gas turbine. The bearing detection method includes: starting a rotor to enable the rotor to rotate at a first rotating speed along a first direction, wherein the first direction is a rotating direction when the rotor operates normally, and the first rotating speed is a calibration value; acquiring a first torque, wherein the first torque is an output torque when the rotor rotates at the first rotating speed along the first direction; and judging the first torque and a torque threshold value, wherein the torque threshold value is a calibration value, and if the first torque is smaller than the
(Continued)

torque threshold value, it is judged that a bearing is fault-free.

7 Claims, 8 Drawing Sheets

(58) Field of Classification Search
CPC .. F16C 2360/23; F16C 17/24; F16C 32/0406; F16C 33/1005; F16C 17/02; F16C 2300/12; F16C 2300/14
See application file for complete search history.

(56) References Cited

FOREIGN PATENT DOCUMENTS

| | | |
|---|---|---|
| CN | 110864900 A | 3/2020 |
| WO | 2018235611 A1 | 12/2018 |

\* cited by examiner

Flow 300

Flow 400

BEARING DETECTION METHOD, BEARING DETECTION SYSTEM, METHOD FOR STARTING GAS TURBINE AND SYSTEM FOR STARTING GAS TURBINE

CROSS REFERENCE TO THE RELATED APPLICATIONS

This application is the national phase entry of International Application No. PCT/CN2020/135890, filed on Dec. 11, 2020, which is based upon and claims priority to Chinese Patent Application No. 201911342263.X, filed on Dec. 23, 2019, the entire contents of which are incorporated herein by reference.

TECHNICAL FIELD

The present invention relates to the related field of bearing technologies, in particular to a bearing detection method, a bearing detection system, a gas turbine starting method and a gas turbine starting system.

BACKGROUND

An air bearing is a bearing that plays a supporting role by using an air elastic cushion. Compared with other types of bearings, the air bearing has the advantages that frictional loss is small and heating deformation is small as air is very small in viscosity; the air bearing is easy to operate, low in cost, high in reliability and easy to maintain, and energy dissipation of a lubricating oil supply and filter system is avoided. Thus, the air bearing is quite suitably applied to application occasions such as an ultraprecise and superspeed rotating shaft, for example, a micro gas turbine. The air bearing may operate normally to form a pressure air film to support a rotor of the gas turbine, which is a precondition that the gas turbine may be started successfully. In the starting stage of the gas turbine, if the air bearing is damage or the rotor shaft is subjected to bending deflection, the pressure air film cannot be formed to support the rotor of the gas turbine, so that a condition that the rotor may not be accelerated as a result of a too large friction force between the rotor and a control bearing may be caused. If the rotor is dragged in a forced manner to accelerate, a severe consequence that the rotor is damaged or other parts of the gas turbine are damaged is caused.

Therefore, for the rotor system adopting the air bearing, it is a technical problem needed to be solved urgently by those skilled in the art that the air bearing is detected in the starting stage, it is ensured that the bearing may support the rotor successfully, and faults are reported timely under the condition that the bearing has a fault.

SUMMARY

In order to solve the technical problem, an objective of the present invention is to provide a bearing detection method, a bearing detection system, a gas turbine starting method and a gas turbine starting system.

According to one aspect of the present invention, provided is a bearing detection method for supporting fault detection of an air bearing or a mixed bearing formed by the air bearing and a magnetic bearing of a rotor when the rotor is started, the method including:

starting the rotor to enable the rotor to rotate at a first rotating speed along a first direction, wherein the first direction is a rotating direction when the rotor operates normally, and the first rotating speed is a calibration value;

acquiring a first torque, wherein the first torque is an output torque when the rotor rotates at the first rotating speed along the first direction; and judging the first torque and a torque threshold value, wherein the torque threshold value is a calibration value, and if the first torque is smaller than the torque threshold value, it is judged that a bearing is fault-free.

Further, the bearing is further detected if the first torque is greater than or equal to the torque threshold value when the first torque and the torque threshold value are judged, wherein the detection method further includes:

controlling the rotor to reverse to enable the rotor to rotate at a second rotating speed along a second direction, wherein the second direction is a direction contrary to the first direction, and the second rotating speed is a calibration value;

acquiring a reversing time, wherein the reversing time is a duration from a moment when the rotor is reversed to a moment when the rotor rotates at the second rotating speed along the second direction; and judging the reversing time and a reversing time threshold value, wherein the reversing time threshold value is a calibration value, and if the reversing time is greater than or equal to the reversing time threshold value, it is judged that the bearing has a fault.

Further, the bearing is further detected if the first torque is greater than or equal to the torque threshold value when the first torque and the torque threshold value are judged, wherein the detection method further includes:

controlling the rotor to reverse to enable the rotor to rotate at a second rotating speed along a second direction, wherein the second direction is a direction contrary to the first direction, and the second rotating speed is a calibration value;

acquiring a second torque, wherein the second torque is an output torque when the rotor rotates at the second rotating speed along the second direction; and judging the second torque and a torque threshold value, wherein the torque threshold value is a calibration value, and if the second torque is greater than or equal to the torque threshold value, it is judged that the bearing has a fault.

Further, the bearing is further detected if the first torque is greater than or equal to the torque threshold value when the first torque and the torque threshold value are judged, wherein the detection method further includes:

controlling the rotor to reverse to enable the rotor to rotate at a second rotating speed along a second direction, wherein the second direction is a direction contrary to the first direction, and the second rotating speed is a calibration value;

acquiring the reversing time and the second torque, wherein the reversing time is the duration from the moment when the rotor is reversed to the moment when the rotor rotates at the second rotating speed along the second direction, and the second torque is an output torque when the rotor rotates at the second rotating speed along the second direction; and judging the reversing time and the reversing time threshold value and the second torque and the torque threshold value, wherein the reversing time threshold value and the torque threshold value are the calibration values, and if the reversing time is smaller than the reversing time threshold value and the second torque is smaller than the torque threshold value, it is judged that the bearing is fault-free, and otherwise, the bearing has the fault.

Further, the method for controlling the rotor to reverse to enable the rotor to rotate at a second rotating speed along a second direction includes: reducing the speed of the rotor to zero first and then controlling the rotor to rotate reversely to raise the speed to the second rotating speed.

Further, the method for acquiring a first torque and a second torque includes: determining an output torque $t_1$ of the rotor based on voltage and current values fed back when the rotor is a motor rotor:

$$t_1 = P_{mechanical}/\omega \quad (1)$$

$$P_{mechanical} \approx P_{electrical} = 3 U_{phase} \times I_{phase} \text{ or}$$
$$P_{mechanical} \approx P_{electrical} = 3 U_{phase} \times I_{phase} = \sqrt{3} U_{line} \times I_{line} \quad (2)$$

wherein $P_{mechanical}$ is mechanical power output by the rotor, $P_{electrical}$ is electric power of the motor, $\omega$ is an angular speed and a phase current $I_{phase}$ is equal to a linear current $I_{line}$.

Further, the method for acquiring a first torque and a second torque includes: determining an output torque $t_1$ of the rotor based on voltage and current values fed back when the rotor is a motor rotor:

$$t_1 = P_{mechanical}/\omega \quad (1)$$

$$P_{mechanical} = \eta P_{electrical} = \eta \times 3 U_{phase} \times I_{phase}$$
$$\text{或} \; P_{mechanical} = \eta P_{electrical} = \eta \times \sqrt{3} U_{line} \times I_{line} \quad (3)$$

wherein $P_{mechanical}$ is mechanical power output by the rotor, $P_{electrical}$ is electric power of the motor, $\omega$ is an angular speed, a phase current $I_{phase}$ is equal to a linear current $I_{line}$, and $\eta$ is efficiency of converting electric energy of the motor into mechanical energy, an estimated value.

According to another aspect of the present invention, provided is a bearing detection system for supporting fault detection of an air bearing or a mixed bearing formed by the air bearing and a magnetic bearing of a rotor when the rotor is started, the detection system detecting a bearing fault when the rotor is started by using the bearing detection method.

According to another aspect of the present invention, provided is a gas turbine starting method, a gas turbine using an air bearing or a mixed bearing formed by the air bearing and a magnetic bearing, wherein the method includes: detecting whether the bearing has a fault or not by using the bearing detection method according to any one of claims 1-7 when the gas turbine is started; if the bearing is fault-free, entering a speed-raising stage of the gas turbine; and otherwise, reporting the fault shutting down the gas turbine.

According to another aspect of the present invention, provided is a gas turbine starting system, a gas turbine using an air bearing or a mixed bearing formed by the air bearing and a magnetic bearing, wherein the starting system detects whether the bearing has a fault or not by using the bearing detection method when the gas turbine is started; if the bearing is fault-free, entering a speed-raising stage of the gas turbine; and otherwise, reporting the fault shutting down the gas turbine.

Compared with the prior art, the present invention has the following beneficial effects:

1. The detection method and the detection system of the present invention may ensure good operation of an air bearing in a starting stage of the rotor system using the air bearing or the mixed bearing formed by the air bearing and the magnetic bearing to prevent a condition that the rotor may not be accelerated as a result of a too large friction force between the rotor and the bearing because the gas turbine is accelerated rashly under the condition that an unknown air bearing or the mixed bearing has faults and even a severe consequence that the rotor is damaged or other parts of the system are damaged.
2. The gas turbine starting method and the gas turbine starting system of the present invention may guarantee stable start of the gas turbine, may prevent the severe consequence that the rotor is damaged or other parts of the gas turbine are damaged as a result of too large friction force between the rotor and the bearing of the gas turbine effectively and are simple and reliable. Detection may be carried out based on existing hardware without adding an extra detection mechanism.

DETAILED DESCRIPTION OF THE EMBODIMENTS

In order to better understand the technical scheme of the present invention, further description of the present invention will be made below in combination with specific embodiments and drawings of the description.

Figure 1:
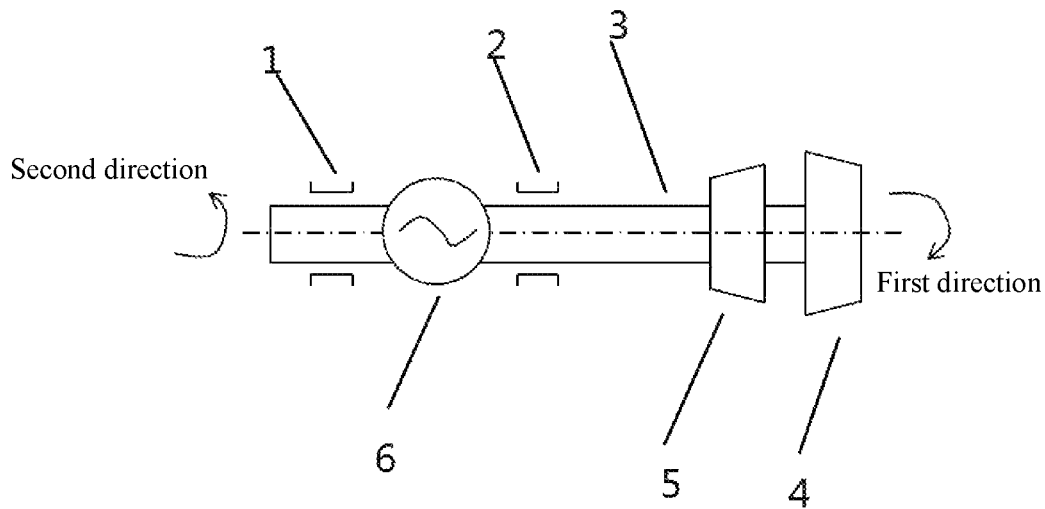
FIG. 1 is a schematic diagram of a supporting scheme of a rotor bearing of a generating unit of a gas turbine in an embodiment of the present invention.

Referring to FIG. 1, it is a schematic diagram of a supporting scheme of a rotor bearing of a generating unit of a gas turbine provided in an embodiment of the present invention. In the figure, marks of the drawing are respectively: 1, first air bearing, 2, second air bearing, 3, rotor, 4, turbine, 5, compressor, 6, motor. The supporting mode in the figure is schematic, and actually, there may be various supporting schemes. For example, a third bearing may be arranged between the compressor 5 and the turbine 4.

It is to be understood that the supporting scheme of the bearing of the rotor does not limit bearing detection in the gas turbine starting stage in the present invention. The bearing is a non-contact type bearing, and may be either an air bearing or a mixed bearing formed by the air bearing and the magnetic bearing.

Meanwhile, it is to be understood that the gas turbine in the present invention is merely an example of a rotor system including the air bearing or the mixed bearing of the air bearing and the magnetic bearing. It is to be noted that although a generating unit of the micro gas turbine with relatively small rated power in the embodiment of the application is preferably taken as the rotor system, actually, the bearing detection method, the bearing detection system, the gas turbine starting method and the gas turbine starting system are similarly suitable for a system including generating units of small, medium and large gas turbines with relatively high power and other rotor systems including the air bearing or the mixed bearing formed by the air bearing or the air bearing and the magnetic bearing.

Figure 2:
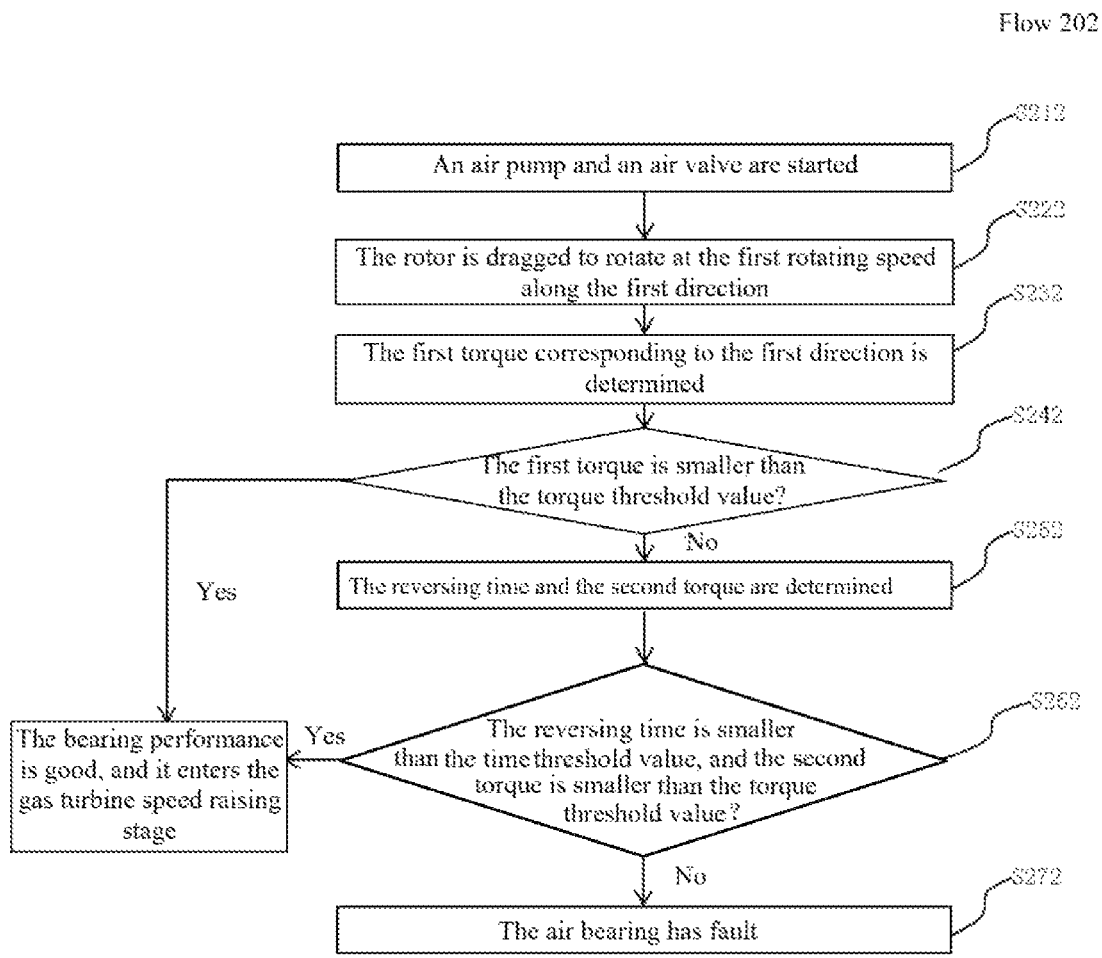
FIG. 2 is a flow diagram of bearing detection in the embodiment of the present invention.

Referring to FIG. 2, it is a bearing detection diagram 202 when the gas turbine is started in the embodiment of the present invention.

S212: an air pump and an air valve are started.

Figure 3:
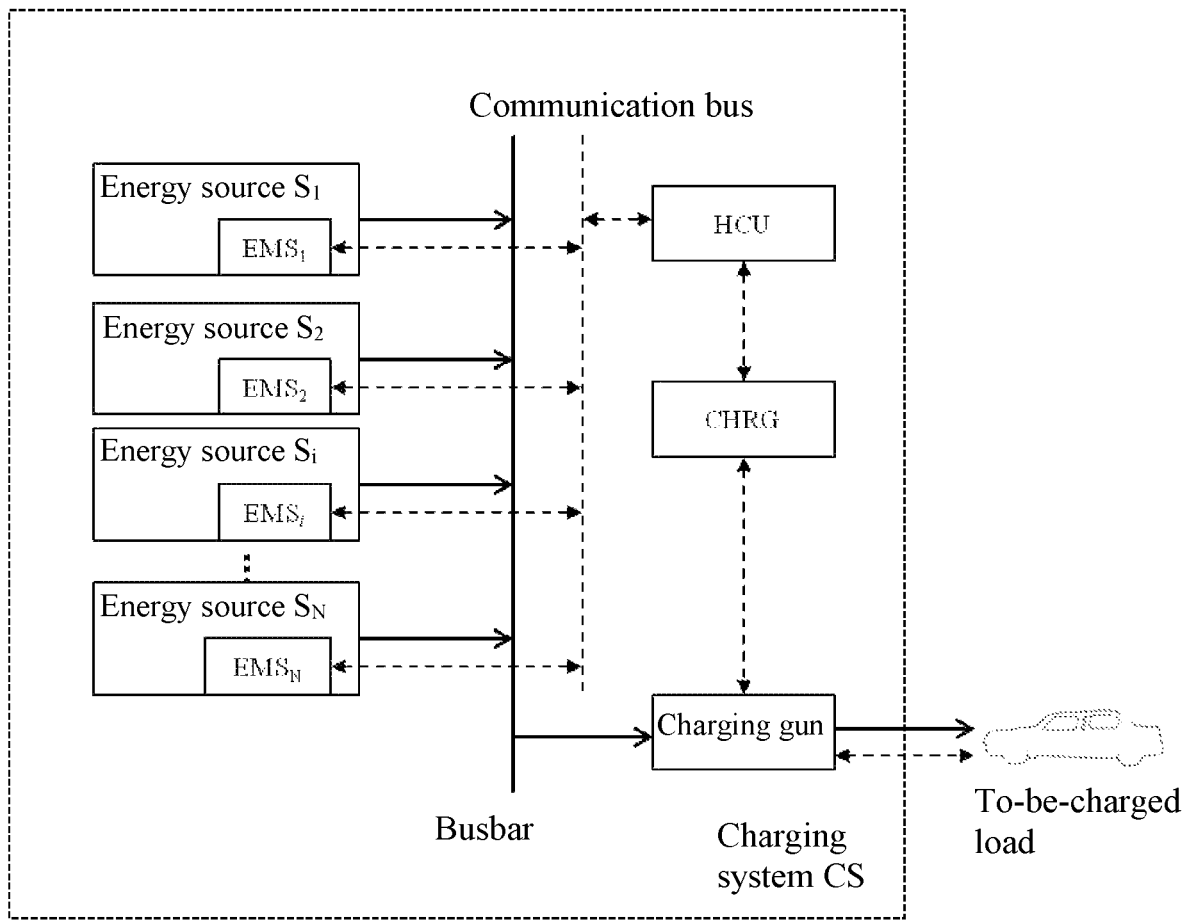
FIG. 3 is a structural schematic diagram of a charging system in the embodiment of the present invention.
Figure 4:
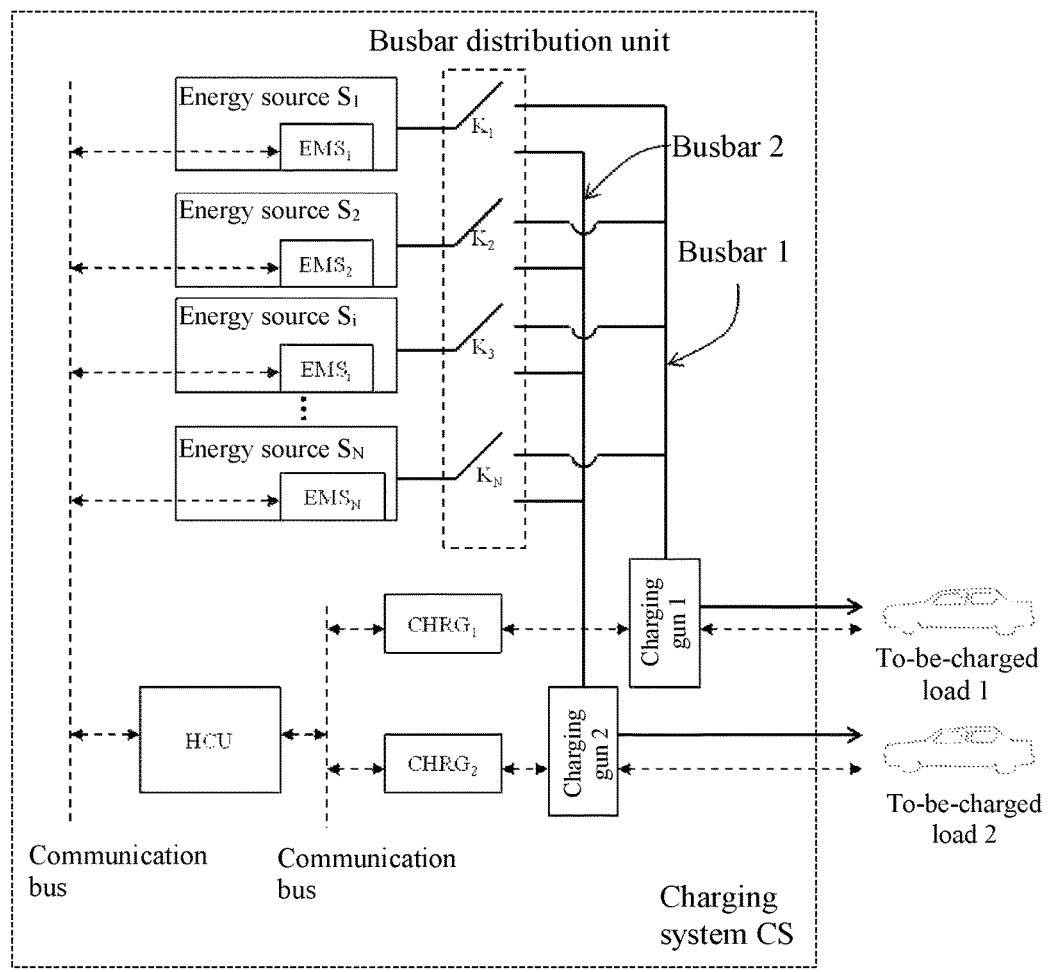
FIG. 4 is a structural schematic diagram of a charging system adopting a plurality of charging guns in the embodiment of the present invention.
Figure 5:
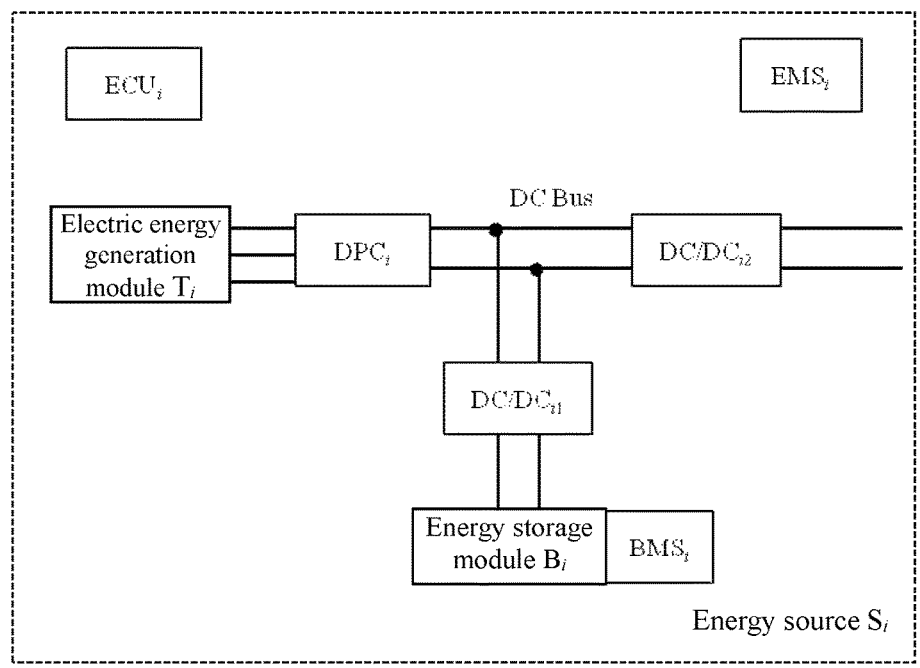
FIG. 5 is a structural schematic diagram of an energy source in the embodiment of the present invention.

Specifically, $ECU_i$ controls the air pump and the air valve to start and provides a gas source to the air bearing, and the gas source enters from an air inlet hole of the air bearing. $ECU_i$ electronic control unit (ECU) is primarily used to realize closed loop control of output power of the gas turbine, in combination with information fed back of each sensor, matched with a controller $DPC_i$ (Digital Power Controller) by controlling executors such as a pump body, a valve body and an ignition controller in an oil gas circuit. $ECU_i$ and $DPC_i$ detailed description is seen in the embodiments of the charging system and the energy source structure, as shown in FIGS. 3-5 and related description.

S222, the rotor is dragged to rotate at the first rotating speed along the first direction.

Specifically, $DPC_i$ works to drag the rotor of a synchronous motor coaxially connected with the gas turbine to rotate at the first rotating speed along the first direction. The first direction may be defined as a rotating direction when an impeller of a gas turbine operates normally. The value range of the first rotating speed is not defined specifically and is subject to a calibration value in a calibration experiment. For example, as far as a gas turbine with a rated speed of more than ten thousands of revolution to hundreds of thousands of revolution is concerned, the rotating speed of the first rotating speed may be hundreds-ten thousand revolution/min (r/m).

S232, the first torque corresponding to the first direction is determined.

The first torque is an output torque when the rotor of the synchronous motor rotates at the first rotating speed along the first direction (also referred as to torque). Specifically, $DPC_i$ determines the first torque $t_i$ based on voltage and current valves fed back. Specifically, for the motor, the rotor outputs the torque $t_1 = P_{mechanical}/\omega \cdot P$ is mechanical power output by the rotor, and $\omega$ is angular speed. The mechanical power output by the motor may be solved similarly by electrical power of the motor $P_{mechanical} \approx P_{electrical} = 3U_{phase} \times I_{phase}$ or $P_{mechanical} \approx P_{electrical} = \sqrt{3}U_{line} \times I_{line}$, and a phase current $I_{phase}$ is equal to a linear current $I_{line}$.

In some other embodiments, the mechanical power $P_{mechanical}$ may further be solved by multiplying the electrical power of the motor with efficiency η that electric energy of the motor is converted into mechanical energy, for example, $P_{mechanical} = \eta P_{electrical}$, wherein η is an estimated value.

S242, if the first torque is smaller than the torque threshold value, it is determined that the bearing performance is good and the bearing enters a speed raising stage of the gas turbine. Specifically, when it is determined that the bearing performance is good, the bearing detection flow is finished and the gas turbine starting flow 201 is executed continuously.

It is executed from S221 of the flow 201 (because the voltage of the DC bus has been established), and the flow 201 is seen the gas turbine starting embodiment below.

When the performance of the air bearing is good and the air bearing is damage or fault-free, the pressure air film may be formed between the air bearing and the rotor of the gas turbine to support the rotor, and the rotor of the motor is in a floating state and is not mechanically contacted with the air bearing. The first torque at the time is smaller than the torque threshold value.

The amplitude of the torque threshold value is not defined specifically and is subject to a calibration value in a calibration experiment. When the gas turbines of different models or the gas turbines with same model operate at different first rotating speeds, the calibrated torque threshold value may be different.

S252, otherwise, the reversing time and the second torque are determined.

In some embodiments, if the first torque is greater than or equal to the torque threshold value, whether the air bearing has fault or not may not be judged immediately at the time, and it is necessary to further determine the reversing time and whether the air bearing has fault or not is further judged by the reversing time.

In some other embodiments, if the first torque is greater than or equal to the torque threshold value, whether the air bearing has fault or not may not be judged immediately at the time, and it is necessary to further determine a second torque and whether the air bearing has fault or not is further judged by the second torque.

In some other embodiments, if the first torque is greater than or equal to the torque threshold value, whether the air bearing has fault or not may not be judged immediately at the time, and it is necessary to further determine the reversing time and the second torque and whether the air bearing has fault or not is further judged by the reversing time and the second torque.

The reversing time is defined as a duration from a moment when the rotor is reversed to a moment when the rotor rotates at the second rotating speed along the second direction. The second torque is defined as an output torque when the rotor of the synchronous motor rotates at the second rotating speed along the second direction. The second direction is defined as a direction contrary to the first direction. The second rotating speed and the first rotating speed may be same or different in magnitude.

S262, if the reversing time is smaller than the reversing time threshold value and the second torque is smaller than the torque threshold value, it is determined that performance of the bearing is excellent, and it enters the speed raising stage of the gas turbine. Specifically, when the performance of the bearing is excellent, the bearing detection flow is finished, and it is continuous to execute the gas turbine starting flow 201. It is executed from S221 of the flow 201

(because the voltage of the DC bus has been established), and the flow 201 is seen the gas turbine starting embodiment below.

Specifically, $DPC_i$ drags the rotor first to zero in speed and then controls the rotor to rotate reversely to raise the speed to the second rotating speed. $DPC_i$ may change the rotating direction of the rotor by controlling a three-phase electrified phase sequence of the synchronous motor. The method for determining the second torque is as same as the method for determining the first torque.

In some embodiments, whether the air bearing has fault or not is further judged merely by the reversing time. When the reversing time is smaller than the reversing time threshold value, whether the air bearing has fault or not is further judged by the second torque. If the reversing time is smaller than the reversing time threshold value and the second torque is smaller than the torque threshold value, it is determined that performance of the bearing is excellent.

In some other embodiments, whether the air bearing has fault or not is further judged merely by the second torque. When the second torque is smaller than the reversing time threshold value, whether the air bearing has fault or not is further judged by the reversing time. If the reversing time is smaller than the reversing time threshold value and the second torque is smaller than the torque threshold value, it is determined that performance of the bearing is excellent.

In some other embodiments, whether the air bearing has fault or not is further judged by the reversing time and the second torque at the same time. When the reversing time is smaller than the reversing time threshold value, and the second torque is smaller than the torque threshold value, it is determined that performance of the bearing is excellent.

S272, if the reversing time is greater than or equal to the reversing time threshold value or the second torque is greater than or equal to the torque threshold value, it is determined that the air bearing has fault.

Specifically, $DPC_i$ reports an error to $ECU_i$ after judging that the bearing has fault, $ECU_i$ further reports an error to HCU, the HCU determines whether the gas turbine is shut down or not immediately, and if it is determined that the gas turbine is shut down, the gas turbine shut-down flow 300 may be executed. Specific description on the HCU is seen in the embodiment of the charging system. The gas turbine shut-down flow 300 is seen in the embodiment of the gas turbine shut-down flow in detail.

In some embodiments, whether the air being has fault or not is further judged merely by the reversing time, and if the reversing time is greater than or equal to the reversing time threshold value, it is determined that the air bearing has fault.

In some other embodiments, whether the air bearing has fault or not is further judged merely by the second torque. When the second torque is greater than or equal to the torque threshold value, it is determined that the air bearing has fault.

In some other embodiments, whether the air bearing has fault or not is further judged by the reversing time and the second torque at the same time. When the reversing time is greater than or equal to the reversing time threshold value, or the second torque is greater than or equal to the torque threshold value, it is determined that performance of the bearing is excellent.

The detection method provided by the embodiments ensures good operation of an air bearing in a gas turbine starting stage to prevent a situation where the rotor may not be accelerated as a result of a too large friction force between the rotor and a control bearing and to even prevent a severe consequence that the rotor is damaged or other parts of the gas turbine are damaged when the gas turbine is accelerated rashly under the condition having a faulty unknown air bearing. The detection method is simple and reliable, and may be performed based on an existing hardware without adding an extra detection mechanism.

In order to better understand the technique, the embodiments of the present invention further provide a charging system.

Referring to FIG. 3, it is a schematic diagram of an embodiment of the charging system provided by the present invention.

The whole charging system (CS) includes N parallel (N is greater than or equal to 1) energy sources $S_i$, a charging control unit CHRG (CCU), a hybrid control unit (HCU), a busbar and a charging gun. The charging gun is connected with the energy sources $S_i$ via the busbar and the HCU is connected with each energy source $S_i$ via a communication bus. The CHRG directly takes part in charging control communication of a charged vehicle. Software and hardware functional requirements of the CHRG follow a national standard (GBT 27930-2015) of a non-vehicle-mounted charger that charges an electric automobile, including flows such as physical connection completion, low voltage assistant electrification, charging grip, charging parameter configuration, charging stage and ending of charging. The CHRG records all parameters of a charged vehicle in the charging process, for example, power requirement and an SOC value of a power battery, and uploads the parameters to the HCU dynamically. The HCU or an energy management system $EMS_i$ (EMS) in the energy source $S_i$ determines output power of each energy source $S_i$ according to the power requirement of a to-be-charged load and state information of each energy source $S_i$, a charging current is output to the to-be-charged load via the charging gun and the charging gun is directly connected with the to-be-charged load.

Referring to FIG. 4, it is another schematic diagram of an embodiment of the charging system provided by the present invention. In the embodiment, the CS may be provided with a plurality of charging guns. In the drawing, two charging guns are taken as an example. The two charging guns are connected with the HCU via the two CHRG, the two charging guns are connected with a confluence distribution unit via the busbars respectively, the confluence distribution unit comprises switches same with the energy source $S_i$ in quantity, and the switches are used for outputting electric energy of the energy source $S_i$ to one of the busbars 1 and 2. By arranging the plurality of charging guns, simultaneous charging operations of a plurality of to-be-charged loads may be met. In the embodiment, the HCU acquires the power requirement of each to-be-charged load from each CHRG, and the HCU or the EMS $EMS_i$ in the energy source $S_i$ determines output power of each energy source $S_i$ according to the power requirement of the to-be-charged load and state information of each energy source $S_i$.

Referring to FIG. 5, it is a structure diagram of an embodiment of the energy source $S_i$ provided by the present invention. In the embodiment, in the N parallel energy sources $S_i$, each energy source $S_i$ includes an electric energy generation module $T_i$, an energy storage module $B_i$ and an energy management system $EMS_i$.

In the embodiment, besides the electric energy generation module $T_i$ and the energy storage module $B_i$ (including the battery management system $BMS_i$), the single energy source $S_i$ further includes a fuel supply system, a sensor, an electronic control unit ECU (ECU), a $DPC_i$ digital power controller (DPC), a DC/DC controller) and a $EMS_i$. (not shown one by one).

wherein the electric energy generation module $T_i$, the electric energy generation module $T_i$ is configured to generate electric energy and is composed of a prime motor and a generator, the prime motor refers to a heat energy generator that converts energy of a fuel into mechanical energy and outputs the mechanical energy via a rotating shaft, and the generator converts the mechanical energy generated by the prime motor into electric energy to be output. The generator may further operate as an electric motor in a starting stage of the prime motor to drag the prime motor to rotate. The prime motor may be a diesel generator, a gasoline generator, a gas turbine and the like. In the embodiment, a micro gas turbine (micro gas turbine, micro turbine or MT (microturbine) for short) is preferentially used as the prime motor, and at the moment, the electric energy generation module $T_i$ is a power generation unit of the micro gas turbine composed of the micro gas turbine and the generator. Compared with a conventional power generation unit of an internal combustion engine (for example a power generation unit of a diesel engine), the power generation unit of the micro gas turbine has the advantages of small size, light weight, small vibration, low noise, fast start, few moving parts, long service life, easy maintenance, environmental-friendliness, wide fuel adaptability and the like. Therefore, besides a common power supply capable of serving as an important national defense facility in the field of military science, a standby power supply for devices for military communication or missile firing, a common/standby power supply for a small commercial building in the civil field and a distributed power supply system in a remote region, the power generation unit of the micro gas turbine is expected to be widely applied to the field of charging of electric automobiles.

The unit capacity of the micro gas turbine (the power generation unit) is usually within 300 kW. The scope of the unit capacity of the micro gas turbine (the power generation unit) is not defined uniformly nationally, and some scholars think that it, the power of which is smaller than 500 kW, is the micro gas turbine (the power generation unit). But these do not limit the application. It is to be noted that although the power generation unit of the micro gas turbine with relatively small rated power in the embodiment of the application is preferably taken as the electric energy generation module, actually, the method is similarly suitable for a system including power generation units of small, medium and large gas turbines with relatively high power. Therefore, the application does not define the unit capacity of the gas turbine (the power generation unit) specifically, and the application is substituted by a universal "gas turbine" or a "gas turbine" if being referred. In addition, as far as the power generation unit of the gas turbine is concerned, the gas turbine as the prime motor is the party that provides energy, and the energy loss from the gas turbine to the generator may be ignored. Therefore, in the application, "the output power/the rated power/the unit capacity of the gas turbine" is identical to the "the output power/the rated power/the unit capacity of the power generation unit of the gas turbine". Similarly, in the application, "the output power/the rated power/the unit capacity of the prime motor" is also identical to the "the output power/the rated power/the unit capacity of electric energy generation module $T_i$".

Start control of the electric energy generation module $T_i$ is one of control contents of the CS. As start control of the electric energy generation module $T_i$ refers to dragging the prime motor of $T_i$ by the generator of $T_i$ from being static to operate at the starting rotating speed. Therefore, in the application, terms "start of the electric energy generation module $T_i$", "start of the prime motor of the electric energy generation module $T_i$", "start of the prime motor" and the like show consistent meaning. In the starting stage, the generator of $T_i$ operates as the electric motor, and needed electric energy may be provided by the energy storage module $B_i$. In the starting stage, besides electric energy consumption to drag the prime motor to operate to the starting rotating speed, it is further necessary to control other variables precisely, for example, a temperature, a fuel amount, an air quantity and the like. It may be seen that start of the electric energy generation module $T_i$ is a process not only consuming energy but also being complex. In the working process of the CS, the start-stop number of times of the electric energy generation module $T_i$ is reduced reasonably, so that the system efficiency may be improved effectively, the system loss may be reduced effectively, and the control system burden may be alleviated effectively.

The energy storage module $B_i$ the energy storage module $B_i$ plays various roles of providing starting electric energy to the prime motor of the electric energy generation module $T_i$, outputting electric energy outwards to the load and storing the electric energy generated by the energy storage module $T_i$. The energy storage module $B_i$ in the embodiment may be a chargeable and dischargeable electric energy storage device in any form, for example, a storage battery, a super capacitor and the like.

The EMS $EMS_i$ finishes power management in the single energy source $S_i$ according to the distributed output power and determines start-stop of the electric energy generation module $T_i$ and charging and discharging powers of the energy storage module $B_i$ so as to realize efficient utilization of energy.

ECU is matched with $DPC_i$ to realize closed-loop control of the output power of the electric energy generation module $T_i$ in combination with information fed back by each sensor by controlling executors such as a pump body, a valve body and an ignition controller in an oil-gas path.

$DC/DC_{i1}$ stabilizes a busbar voltage and realizes table start-stop of the electric energy generation module $T_i$ by controlling charging and discharging of the energy storage module $B_i$.

$DC/DC_{i2}$ discharges an external to-be-charged load based on an instruction of $EMS_i$.

For the structure of the energy source $S_i$ of the embodiment, the required power of the load may be distributed by coordination of the HCU connected with the energy source $S_i$ and $EMS_i$ in the energy source $S_i$.

When the required power of the load is distributed via the HCU, the HCU acquires the power information (including the power requirement and/or the SOC value of the load power battery and the like) of the charged load and the state information (including operation state information of the current electric energy generation module $T_i$ and electric quantity state information of the energy storage module $B_i$ and the like) of each energy source $S_i$ provided by $EMS_i$, and determines the output power of each energy source $S_i$ according to the power information of the load and the state information of the energy source $S_i$;

When the required power of the load is distributed by coordination of EMS in the energy source $S_i$, the HCU acquires the power information (including the power requirement and/or the SOC value of the load power battery and the like) of the charged load in real time and sends the information to each energy management system $EMS_i$, and each EMS $EMS_i$ determines the output power $P_{Si}$ of each energy source $S_i$ in the energy sources $S_i$ according to the power requirement of the load and the state information of the energy source $S_i$ (including the operating state information of the current electric energy generation module $T_i$ and the electric quantity state information of the energy storage module $B_i$ and the like).

Besides the functions, the HCU connected with the energy source $S_i$ may further be used to summarize and report the state, summarize the state information of all the energy sources $S_i$ and the state information of the charged load in real time and report the information to a vehicle-mounted terminal and/or an upper server as well as receive the information (for example, a scheduling instruction, position information of the to-be-charged load and the like) of the vehicle-mounted terminal and/or the upper server.

In the embodiment, each energy source $S_i$ internally includes an energy storage module $B_i$. According to the arrangement mode, the CS may adjust the output power finely to track the load requirement precisely so as to save the charging time and improve the charging efficiency, thereby it is more suitable for being applied to emergency charging occasions expected to charge quickly. For example, the CS may be loaded on a mobile vehicle as a (emergency) charging vehicle receiving an electrical requirement of a user anytime and driving to a preset service location to provide an electrical service for an electrical load (for example, an electric automobile).

The embodiment of the present invention further provides a structure of another energy source $S_i$. In the embodiment, each energy source $S_i$ includes an electric energy generation module $T_i$ and an energy management system $EMS_i$; the energy source $S_i$ does not internally include the energy storage module $B_i$ and corresponding energy source $S_i$ does not internally include $DC/DC_{i1}$, and at the time, the plurality of energy sources $S_i$ in the whole CS share an external energy storage module B and a corresponding $DC/DC_1$ (not shown in the drawing), the energy storage module B mainly plays a role of providing starting electric energy to the electric energy generation module $T_i$ in the plurality of energy sources $S_i$. Thus, when the required power of the load is distributed, it is unnecessary to consider output of the energy storage module B. In the embodiment, as the output power of the load is not needed in the energy storage module B, the HCU connected with the energy source $S_i$ may not have a function of distributing power between the energy sources $S_i$, and EMS in each energy source $S_i$ is coordinated.

For the structure of the energy source $S_i$ of the embodiment, the required power of the load may be distributed by coordination of the HCU connected with the energy source $S_i$ and EMS in the energy source $S_i$.

When the required power of the load is distributed via the HCU, the HCU acquires the power information (including the power requirement and/or the SOC value of the load power battery and the like) of the charged load and the operating state information of the electric energy generation module $T_i$ in each energy source $S_i$ provided by $EMS_i$, and determines the output power of each energy source $S_i$ according to the power information of the load and the operating state information of the electric energy generation module $T_i$;

When the required power of the load is distributed by coordination of EMS in the energy source $S_i$, the HCU acquires the power information (including the power requirement and/or the SOC value of the load power battery and the like) of the charged load in real time and sends the information to each energy management system $EMS_i$, and each EMS $EMS_i$ determines the output power $P_{Si}$ of each energy source $S_i$ in the energy sources $S_i$ according to the power requirement of the load and the operating state information of the electric energy generation module $T_i$ in the energy source $S_i$.

In the embodiment, the plurality of energy sources $S_i$ share one energy storage module B. Besides saving the cost (the cost of the power battery is relatively high), it is simpler to realize power distribution so as to further reduce the complex degree of the control system. As the energy storage module B does not output electric energy to the load, the CS may not usually track the power requirement of the load precisely at the time and supplies power to the load at a power value lower than then power requirement of the load, so that it is more suitable for being applied to occasions with a cost saving requirement or without strict requirements on charging time. For example, the CS may be formed by connecting more than ten energy sources $S_i$ in parallel as a power supply device of a park or a charging station, thereby providing a charging service for the electric automobile.

In the embodiment of the present invention, the HCU executes distribution of the power of the load uniformly. The EMS in the energy source only needs to control the two power supplies: the internal energy source module and the electric energy generation module, according to the power instruction issued by the HCU, so that the complexity of the system may be reduced, and the system is easily expanded, for example, the quantity of the energy sources may be increased or decreased according specific application occasions with small modification on a HCU control software. Meanwhile, the EMS in the energy source coordinates according to the power requirement of the load provided by the HCU to distribute the power of the load. In the specific implementation process, each EMS $EMS_i$ is arranged as a master energy management system $EMS_i$ and other EMS $EMS_i$ are arranged as slave energy management systems $EMS_i$. The master energy management system EMS is mainly responsible for coordinating operation and thus the complexity of the system may be reduced as well, so that the system is easily expanded, for example, quantity of the energy sources may be increased or decreased according specific application occasions with small modification on an EMS control software. If each EMS $EMS_i$ is not differentiated in master-slave relation, when the energy source $S_i$ is expanded, it is complex to modify corresponding EMS $EMS_i$. The more the expanded energy sources $S_i$ are, the more complex the system becomes.

The embodiments of the present invention further provide a charging method. The charging method is used to output electric energy to the load via the energy source $S_i$, and the electric energy generation module $T_i$ and the energy storage module $B_i$ in the energy source $S_i$ are controlled reasonably to improve the charging efficiency. It is to be understood that although the charging system shown in FIG. 3 and FIG. 4 include the plurality of energy sources, the charging method is also suitable for a condition of a single energy source.

Figure 6:
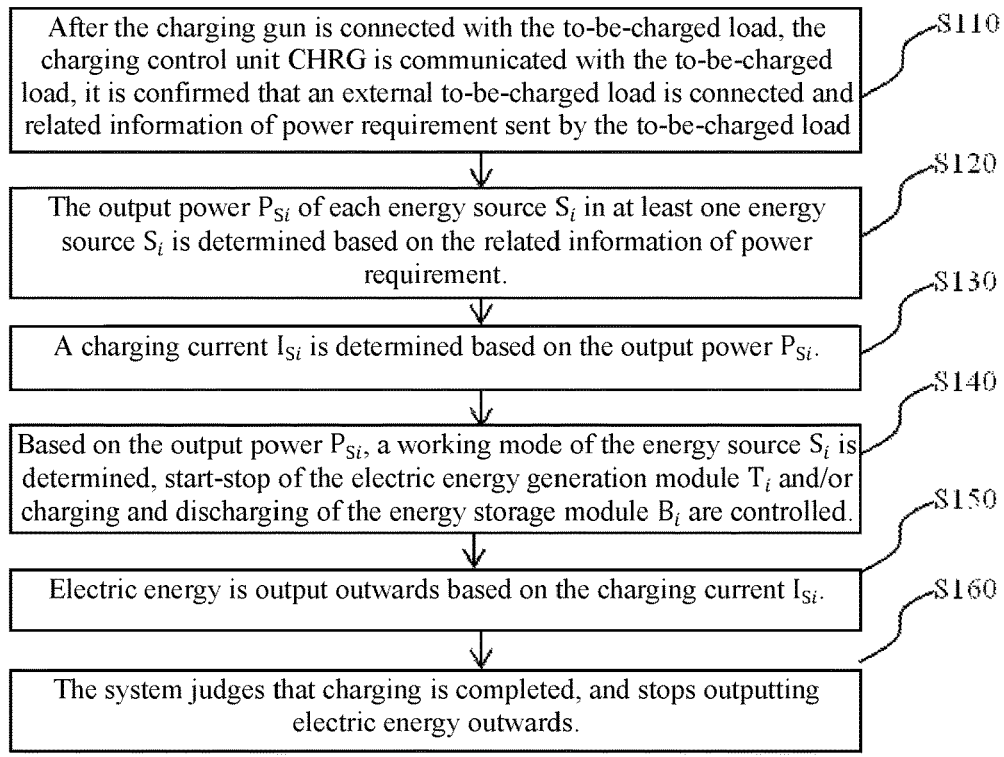
FIG. 6 is a total flow diagram of a charging method in the embodiment of the present invention.

Referring to FIG. 6, it is a total flow diagram of the charging method of the embodiment.

In the charging method of the embodiment, each energy source $S_i$ includes an electric energy generation module $T_i$ (preferably the power generation unit of the gas turbine, i.e., gas turbine+generator, power generation devices in any form capable of generating electric energy) and an energy storage module $B_i$ (preferably a storage battery, electric energy storage devices capable of being charged and discharged in any form).

The total charging flow 100 primarily includes:

S110, after the charging gun is connected with the to-be-charged load, the charging control unit CHRG is communicated with the to-be-charged load, it is confirmed that an external to-be-charged load is connected and related information of power requirement sent by the to-be-charged load.

The related information of power requirement includes the power requirement $P_{load}$ and the SOC value of the power battery of the to-be-charged load.

S120, the output power $P_{Si}$ of each energy source $S_i$ in at least one energy source $S_i$ is determined based on the related information of power requirement.

Specifically, when the CS only includes one energy source $S_i$, it is determined that the required power $P_{load}$ of the load is the output power $P_{Si}$ of the energy source $S_i$. When the CS includes two or more energy sources $S_i$, the HCU finishes a power distribution task among the energy sources $S_i$. Specifically, based on the real-time power requirement of the load, the output power task is distributed to each energy source $S_i$ to meet the real-time power requirement of the load according to a difference of output capacity of each energy source $S_i$, the output power $P_{Si}$ of each energy source $S_i$ is determined, and the method of distributing the requirement power of the load is seen in flows 400, 500 and 600 in detail. The EMS $EMS_i$ in the energy source $S_i$ receives the output power $P_{Si}$ distributed by the HCU and further execute power distribution in the energy source $S_i$ according to the output power $P_{Si}$ to further control charging and discharging of the electric energy generation module $T_i$ and the energy storage module $B_i$ in the energy source $S_i$, which is seen in the flow 700 in detail.

S130, a charging current $I_{Si}$ is determined based on the output power $P_{Si}$.

Specifically, the HCU will send the output power $P_{Si}$ to the EMS $EMS_i$ of the corresponding energy source $S_i$ after determining the output power $P_{Si}$ of each energy source $S_i$. Then, $EMS_i$ determines the charging current $I_{Si}$ based on the output power $P_{Si}$. $I_{Si}=P_{Si}/V_{load}$, $V_{load}$ is associated with the to-be-charged load. For example, when the to-be-charged load is a power battery on the electric automobile, $V_{load}$ is a function of SOC of the battery power, corresponding to SOC in one by one. A follow-up DC/DC controller will control $DC/DC_{i2}$ to output electric energy outwards according the charging current $I_{Si}$.

S140, based on the output power $P_{Si}$, a working mode of the energy source $S_i$ is determined, start-stop of the electric energy generation module $T_i$ and/or charging and discharging of the energy storage module $B_i$ are controlled.

Each energy source $S_i$ in the CS internally includes two power sources: the energy storage module $B_i$ and the electric energy generation module $T_i$. At the time, the EMS $EMS_i$ in the energy source $S_i$ receives the output power $P_{Si}$ distributed by the HCU and further executes power distribution in the energy source according to the output power $P_{Si}$ so as to control the two power sources inside, and different operating states of the two power sources are combined to form a plurality of working modes of the energy source $P_{Si}$.

Specifically, $EMS_i$ judges whether the electric energy generation module $T_i$ is started or stopped or not based on amplitude of the output power $P_{Si}$ and the SOC value of the energy storage module $B_i$. For example, when it is determined that the working mode of the energy source $S_i$ is switched from a mode L1 to a model L2 or from a model M1 to a model M2 or a model M1 to a model H based on the output power $P_{Si}$ and the SOC of the energy storage module $B_i$, it is determined that the electric energy generation module $T_i$ is started. When the prime motor of the electric energy generation module $T_i$ is the gas turbine, it enters the gas turbine starting flow 201; when it is determined that the working mode of the energy source $S_i$ is switched from the model L2 to the model L1 based on the output power $P_{Si}$ and the SOC of the energy storage module $B_i$, the electric energy generation module $T_i$ is shut down. When the prime motor of the electric energy generation module $T_i$ is the gas turbine, it enters the gas turbine shutdown flow 300. When it is determined that the working mode of the energy source $S_i$ is switched from the model L2 to the model M2 or from the model M2 to the model L2 based on the output power $P_{Si}$ and the SOC of the energy storage module $B_i$, the operating state of the electric energy generation module $T_i$ is maintained. Definition of the working mode of the energy source $S_i$ and the switching condition among the modes are seen the flow 700 and related description in detail.

A sequence of S130 and S140 is not limited in the steps of the present invention.

S150, electric energy is output outwards based on the charging current $I_{Si}$.

Specifically, in order to ensure that the output current of $DC/DC_{i2}$ is $I_{Si}$ and may charge the load, the direct current of the direct current bus DC bus is converted into a direct current voltage slight greater than $V_{load}$, i.e., the output voltage $V_{Si}$ of $DC/DC_{i2}$ is slight greater than $V_{load}$. For example, $V_{load}$ is 400V and $V_{Si}$ is 415V. $V_{Si}$A difference with $V_{load}$ is too large, for example, the difference with the former is 600V and the difference with the latter is 400V. $V_{Si}$ will be decreased to be equal to $V_{load}$, so that the load may not be charged. Amplitude of $V_{Si}$ may be calibrated via a testing experiment so as to select a proper value.

S160, the system judges that charging is completed, and stops outputting electric energy outwards.

Specifically, a judging condition may be such that a user requires to stop a charging service (for example, the user clicks "charge over" on an app interface of a mobile phone) or detects that the SOC of the power battery of the to-be-charged load is greater than some expected value (for example 90%).

In some embodiments, after the system judges that the charging service is completed and stops charging externally, as the energy storage module $B_i$ in the energy source $S_i$ in the system is in a power shortage stage, it is necessary to compensate power to energy storage module $T_i$ by the electric energy generation module or compensate power through an external power supply (for example, a power grid), and related description is seen in a flow 800 in detail.

The charging method of the embodiment may control the starting-power generating-stopping process of the electric energy generation module and the energy storage module reasonably to charge the to-be-charged load connected to the charging system efficiently. When the prime motor of the electric energy generation module is the micro gas turbine, as a light and small charging vehicle for the micro gas turbine is flexible to drive and is less limited by a traffic road compared with a large truck, it is more convenient to provide the charging service to a vehicle short of electricity anytime and anywhere. Compared with a conventional charging pile, power of which is originated from a power grid, as the charging pile based on the micro gas turbine is independent from the power grid, the construction cost is saved and it is more flexible to pave. A burden of the power grid is not caused when a lot of electric vehicles are charged, so that the traffic pressure is further alleviated while the pressure of the power grid is alleviated.

The embodiments of the present invention further provides another charging method. In the charging method of the embodiment, each energy source $S_i$ includes an electric energy generation module $T_i$, and the plurality of energy sources $S_i$ share one energy storage module B. The overall charging flow and the start-stop flow of the electric energy generation module $T_i$ in the embodiment are identical to the charging method of the embodiment. The difference is that when the plurality of energy sources $S_i$ of the CS share one energy storage module B, the energy storage module B does not take part in outputting electric energy to the load, and is only responsible to provide starting electric energy to the electric energy generation module $T_i$ in the energy source $S_i$ of the CS, so that it is unnecessary to consider the power of the energy storage module B in the charging process. At the moment, in the charging process, based on the output power $P_{Si}$, it is only necessary to control start and stop of the electric energy generation module $T_i$, which specifically includes that if $P_{Si}$ is greater than 0 and the electric energy generation module $T_i$ in the energy source $S_i$ is in a stopped state, the electric energy generation module $T_i$ is started; if $P_{Si}$ is greater than 0 and the electric energy generation module $T_i$ in the energy source $S_i$ is in an operating state, the electric energy generation module $T_i$ is in the operating state; and if $P_{Si}$ is 0 and the electric energy generation module $T_i$ in the energy source $S_i$ is in the operating state, the electric energy generation module $T_i$ is shut down.

The charging method of the embodiment may control the starting-power generating-stopping process of the electric energy generation module to charge the to-be-charged load connected to the charging system efficiently, and meanwhile, the electric energy generation module is prevented from being started frequently, so that the energy source is saved and the service life of the electric energy generation module is prolonged.

The embodiments of the present invention further provide a method for starting the gas turbine. When the prime motor of the electric energy generation module $T_i$ of the present invention is the gas turbine, the method for starting the gas turbine of the embodiment is preferably adopted to control stable start of the gas turbine, and in the starting process of the gas turbine, the bearing detection method of the application is adopted preferably to detect faults of the bearing.

Figure 7:
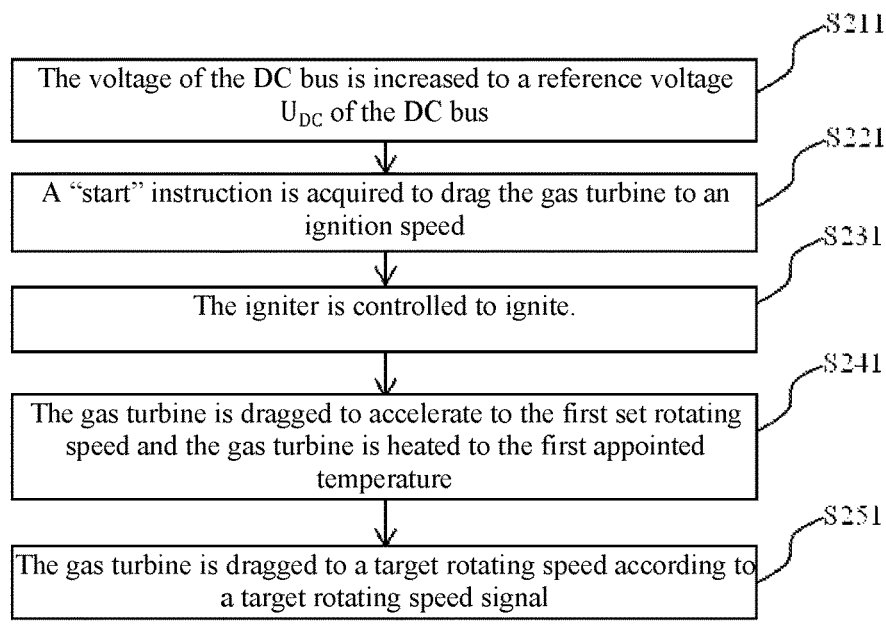
FIG. 7 is a flow diagram of start of the gas turbine in the embodiment of the present invention.

Referring to FIG. 7, the gas turbine starting flow 201,

S211, the voltage of the DC bus is increased to a reference voltage $U_{DC}$ of the DC bus.

In some embodiments, when it is decided that the gas turbine is started, the voltage of the DC bus is not built, i.e., the voltage of the DC bus does not reach a set value $U_{DC}$, and at the time, it is necessary to build the voltage of the DC bus.

In some embodiments, the energy source $S_i$ internally includes the energy storage module $B_i$. At the time, the energy storage module $B_i$ starts and outputs electric energy outwards, and a DC/DC controller controls $DC/DC_{i1}$ to perform boosting conversion on the direct current output by the energy storage module $B_i$ so as to stabilize the voltage value of the DC bus to the reference voltage $U_{DC}$ of the DC bus. The amplitude of $U_{DC}$ may be set, and when its value is larger, it is favorable to reduce the output loss. Correspondingly, the voltage withstand level of each component of the whole CS is further designed correspondingly high.

In some embodiments, when it is decided to start the gas turbine, the system is in the standby state, for example, the energy storage modules $B_i$ and $DC/DC_{i1}$ responsible for providing the starting electric energy have worked to increase the voltage of the DC bus to the set value $U_{DC}$ (for example, 780V, 800V, which may be calibrated). At the time, it is unnecessary to start $DC/DC_{i1}$ to build the voltage. Thus, the step S211 is not a must.

S221, a "start" instruction is acquired to drag the gas turbine to an ignition speed.

Specifically, $DPC_i$ acquires the "start" instruction of $ECU_i$. $DPC_i$ works in an inversion model to invert the direct current of the DC bus to an alternating current. The alternating current provides an alternating current to the motor coaxially arranged with the gas turbine, the motor works in an electric mode, and when the motor rotates, the gas turbine is driven to operate, and the speed is increased gradually to the ignition speed.

S231, an igniter is controlled to ignite.

Specifically, when the gas turbine reaches the ignition speed, $ECU_i$ controls an air pump to increase an air pressure. A fuel pump and a corresponding valve body are started to convey a fuel, and after preparation work is completed, $ECU_i$ controls the ignition controller to ignite, and the fuel starts to combust in the combustion chamber of the gas turbine.

S241, the gas turbine is dragged to accelerate to the first set rotating speed and the gas turbine is heated to the first appointed temperature.

Specifically, $DPC_i$ drags the gas turbine to be accelerated to the first set rotating speed (the numerical values of different gas turbines are different, which is a determined rotating speed range in a gas turbine design stage, for example, 50000-55000 r/s). Then, the gas turbine is maintained invariable at the first appointed rotating speed, closed-loop control is performed on temperature of the gas turbine (for example, the temperature at the back end of the gas turbine), so that the temperature of the gas turbine is increased to the first appointed temperature (the numerical values of different gas turbines are different). It is because the gas turbine is one of heat engines. Only it reaches a certain temperature, can the chemical energy of the fuel be converted into kinetic energy efficiently.

S251, the gas turbine is dragged to a target rotating speed according to a target rotating speed signal.

Specifically, $ECU_i$ sends the target rotating speed (the target rotating speed is calculated through the target output power of the gas turbine, for example, the target output power of the gas turbine is its rated power, the rotating speed calculated according to the rated power and the target rotating speed) to $DPC_i$, and $DPC_i$ drags the gas turbine to the target rotating speed after receiving signals. In the stage, $DPC_i$ may drag the gas turbine to a new rotating speed (corresponding to a new output power) based on a new rotating speed signal.

The embodiments of the present invention further provide a method for shutting down the gas turbine. When the prime motor of the electric energy generation module $T_i$ of the present invention is the gas turbine, the method for shutting down the gas turbine of the embodiment is preferably adopted to control stable stop of the gas turbine.

Figure 8:
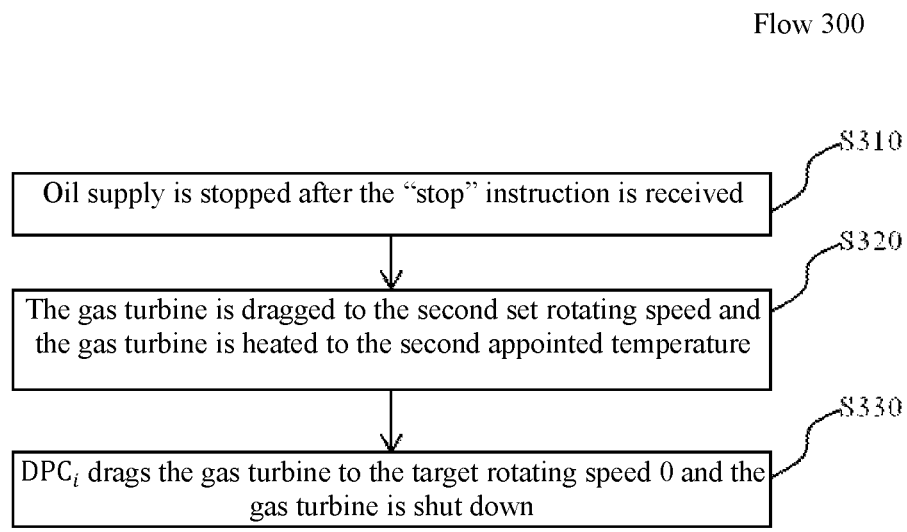
FIG. 8 is a flow diagram of shutdown of the gas turbine in the embodiment of the present invention.

Referring to FIG. 8, the gas turbine shutdown flow 300 includes:

S310, oil supply is stopped after the "stop" instruction is received.

Specifically, $ECU_i$ controls an oil-gas circuit to stop supplying oil after receiving the stop instruction sent by the HCU and sends a second appointed rotating speed signal to $DPC_i$. The second appointed rotating speed may be identical to the first appointed rotating speed and different from the first appointed rotating speed.

S320, the gas turbine is dragged to the second set rotating speed and the gas turbine is heated to the second appointed temperature.

Specifically, $DPC_i$ drags the gas turbine to the second appointed rotating speed and maintains the gas turbine to operate at the second appointed rotating speed. The cooling system of the CS is started to cool the gas turbine to a second appointed temperature. The second appointed temperature may be identical to the first appointed temperature and different from the first appointed temperature.

S330, $DPC_i$ drags the gas turbine to the target rotating speed 0 and the gas turbine is shut down.

The embodiments of the present invention further provide a power distribution method. The power distribution is power distribution among the energy sources $S_i$. The power distribution method means that in the charging process, based on a real-time power demand of the load, the output power task is distributed to each energy source $S_i$ according to difference of each energy source $S_i$ in output capacity to meet the real-time power demand of the load, i.e., the output power $P_{Si}$ of each energy source $S_i$ is determined.

Figure 9:
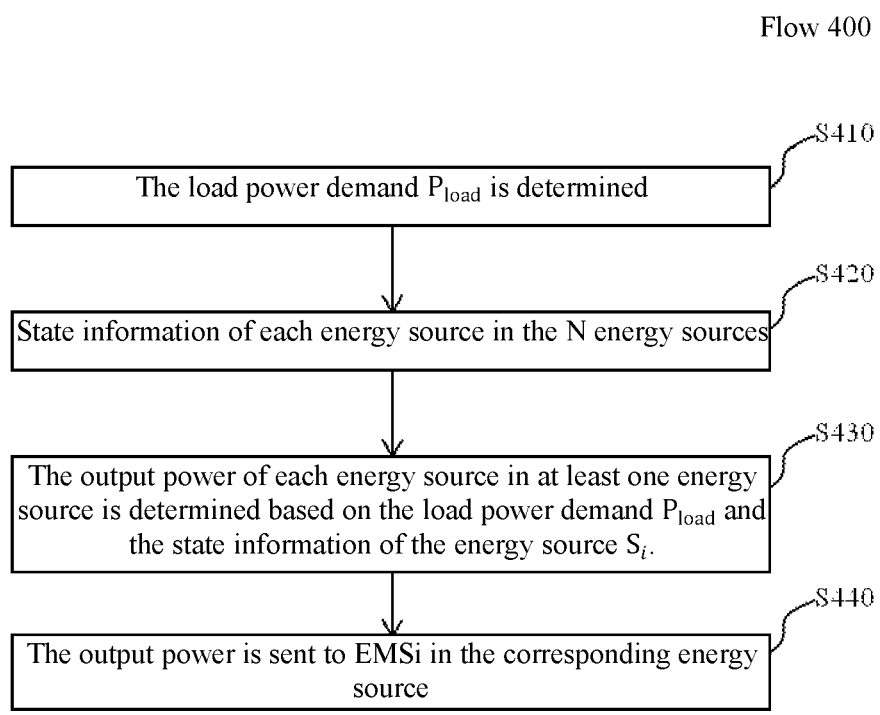
FIG. 9 is a flow diagram of power distribution in the embodiment of the present invention.

Referring to FIG. 9, it is a flow diagram of the power distribution method in the embodiment.

The power distribution method of the embodiment is used in the CS based on parallel connection of more than two energy sources i, wherein each energy source $S_i$ includes an electric energy generation module $T_i$ and an energy storage module $B_i$. The power distribution flow 400 of the plurality of energy sources $S_i$ includes the following steps:

S410, the load power demand $P_{load}$ is determined, that is, the HCU acquires the power demand $P_{load}$ of the external to-be-charged load from the CHRG.

S420, state information of each energy source $S_i$ in the N energy sources (N is greater than or equal to 2). The state information is acquired from $EMS_i$ in the energy source $S_i$ by the HCU.

In the power distribution method of the embodiment, each energy source $S_i$ includes an electric energy generation module $T_i$ (preferably the power generation unit of the gas turbine, i.e., gas turbine+generator, power generation devices in any form capable of generating electric energy) and an energy storage module $B_i$ (preferably a storage battery, electric energy storage devices capable of being charged and discharged in any form). i=1, 2, . . . , N. The state information includes the operating state information of the electric energy generation module $T_i$ and the electric quantity state information of the energy storage module $B_i$. The operating state information of the electric energy generation module $T_i$ indicates that the current operating condition of the electric energy generation module $T_i$ may be shutdown (halt, stop) state, standby state, power generating state, fault state and the like, and may further be some information that indicates performance state of the electric energy generation module $T_i$, for example, data of production, residual fuel amount and the like of the electric energy generation module $T_i$. The electric quantity state information of the energy storage module $B_i$ indicates the current electric quantity condition of the energy storage module $B_i$. As an example, when the energy storage module $B_1$ is preferably a storage battery, the electric quantity state information may be SOC of the state of charge of the battery or SOH of a health degree of the battery; when the energy storage module $B_i$ is preferably a super capacitor, the electric quantity state information may be the SOC of the state of charge of the super capacitor. The state of charge of the battery is used to reflect physical quantity of surplus capacity condition of the battery, and its numerical value is defined as a ratio of the surplus capacity of the battery of the battery capacity; the super capacitor state of charge is capacitor energy actually measured, which represents percentage of square of the maximum nominal voltage of the capacitor.

The SOC of the battery and the state of health of the battery are monitored by the BMS and are reported to the HCU finally. For the energy storage module $B_i$, $$SOH_i = \frac{C_{i(current-max)}}{C_{i(original)}} \times 100\%,$$

$C_{i(current-max)}$ is the maximum capacity capable of being output by the energy storage module $B_i$, and the data is provided by BMS of the energy storage module $B_i$; $C_{i(original)}$ is a factory capacity of the energy storage module B. A normal value range of $SOH_i$ may be set as $SOH_i \in [80\%, 100\%]$, i.e., when SOH is smaller than 80% (the numerical value may be calibrated), the energy storage module $B_i$ is scrapped immediately and it is necessary to replace.

S430, the output power $P_{Si}$ of each energy source $S_i$ in at least one energy source $S_i$ is determined based on the load power demand $P_{load}$ and the state information of the energy source $S_i$.

In the embodiment, the output power $P_{Si}$: $P_{Si}=P_{Ti}+P_{Bi}$ of each energy source $S_i$ module is defined, wherein $P_{Ti}$ is output power of the electric energy generation module $T_i$, and value of $P_{Ti}$ is greater than or equal to 0. $P_{Bi}$ is output power of the electric energy generation module $B_i$, and value of $P_{Bi}$ may be greater than or equal to 0 and may be smaller than 0. When the value of $P_{Bi}$ is greater than 0, it shows that the energy storage module $B_i$ is in a discharging state, i.e., the electric energy is output to the load; when the value of $P_{Bi}$ is smaller than 0, it shows that the energy storage module i is in a charging state, besides electric energy output to the load by $P_{Ti}$, the energy storage module $B_i$ is charged by surplus electric energy.

In the charging method of the embodiment, shown in the formula, each energy source $S_i$ includes two electric energy sources: the electric energy generation module $T_i$ and the energy storage module $B_i$, and the power distribution scheme among the energy sources $S_i$ is seen in flows 500-600 in detail.

S440, the HCU sends $P_{Si}$ to corresponding EMS after determining $P_{Si}$. EMS controls the two power supplies: the electric energy generation module $T_i$ and the energy storage module $B_i$ in the energy source $S_i$ based on $P_{Si}$ to meet a condition that the output power of the energy source $S_i$ is $P_{Si}$. More detailed description on control of the electric energy generation module $T_i$ and the energy storage module $B_i$ in the energy source $S_i$ by EMS based on $P_{Si}$ is seen the flow 700 and related description.

Figure 10:
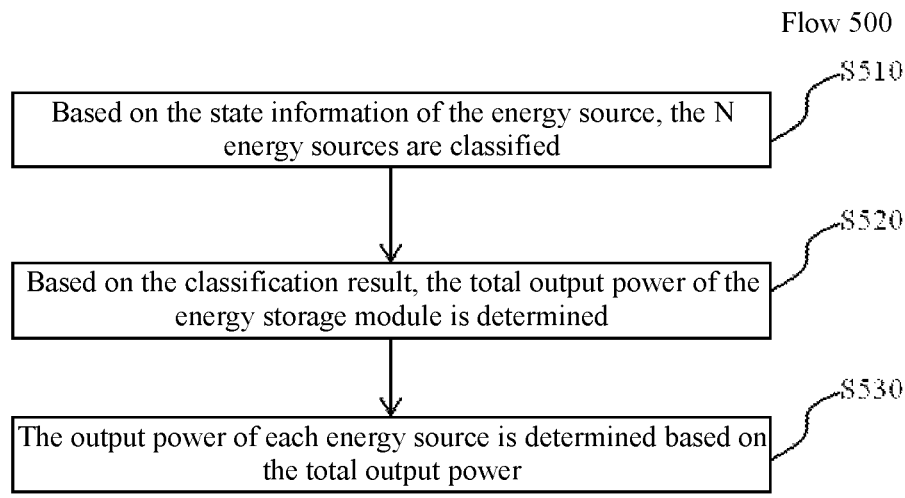
FIG. 10 is a flow diagram of an output power determination method of the energy source in the embodiment of the present invention.

Referring to FIG. 10, the substep flow 500 of the S430 includes:

S510, based on the state information of the energy source $S_i$, the N energy sources $S_i$ are classified.

S511, first of all, the energy sources that do not output electric energy to the current load are determined in the N energy sources $S_i$. The energy sources that do not output electric energy to the current load are judged if any one of the following three conditions is met, and its quantity is marked as p.

First condition: when $SOH_i < 80\%$ (the value may be calibrated) of the energy storage module $B_i$ determines that the energy source $S_i$ is the energy source of the to-be-replaced energy storage module $B_i$, the to-be-replaced energy storage module $B_i$ does not output power externally, i.e., the output power is 0;

second condition: SOHs corresponding to all battery packs in the energy source $S_i$ module are sequenced and the maximum SOH is selected and marked as SOHmax, $\Delta SOH_i$=SOHmax-SOH$_i$ is calculated for SOH$_i$ corresponding to all battery packs in the energy source $S_i$ module, and if $\Delta SOH_i$ is greater than or equal to 0.04 (the value may be calibrated), the energy source $S_i$ does not output power externally, i.e., the output power is 0;

third condition: when the CS includes more than one charging gun (as shown in FIG. 2), the CS may charge the plurality of loads simultaneously. If some energy source $S_i$ charges the other to-be-charged load that operates, the energy source $S_i$ is further confirmed as the energy source module that does not output electric energy to the current load.

S512, a first target energy source and a second target energy source are determined in the residual N-p energy source $S_i$ modules.

n first target energy sources are determined in the residual N-p energy source $S_i$ modules based on the state information of the energy source $S_i$.

When the operation state information of the electric energy generation module $T_i$ shows that the electric energy generation module $T_i$ is in the power generating state (fed back to the HCU by EMS$_i$), it is determined that the energy sources $S_i$ are n first target energy sources. The electric energy generation module in the first target energy sources is marked as the electric energy generation module $T_h$, and the energy storage module is marked as the energy storage module $B_h$, wherein h represents the $h^{th}$ in the n first target energy sources, h=1, 2, . . . , n.

When the operating state information of the electric energy generation module $T_i$ shows that the electric energy generation module $T_i$ is in the stopped state, it is determined that the energy sources $S_i$ are m second target energy source, the electric energy generation module in the first target energy source is marked as the electric energy generation module $T_i$, and the energy storage module is marked as the energy storage module $B_i$, wherein i represents the $i^{th}$, i=1, 2, . . . , m in the m second target energy sources.

A total number of the energy source modules meets a condition: N=p+m+n,
wherein N is a total number of the energy source modules, p is a number of energy sources judged not to output electrical energy to the current load, n is a number of first target energy sources and m is a number of second target energy sources.

It is to be noted that S512 performs classification on the energy sources $S_i$ based on whether the electric energy generation module $T_i$ is in the power generating state or the stopped/standby state or not. In some other embodiments, the energy sources $S_i$ may further be classified based on other operating state information of the electric energy generation module $T_i$. For example, the energy sources $S_i$ may be classified in combination with the electric energy generation module $T_i$ which is in the power generating/stopping/standby state and the residual fuel amount. The energy sources $S_i$ with the electric energy generation module $T_i$ being in the power generating state and the residual fuel amount being greater than or equal to some set threshold value as the first target energy sources; and the energy sources $S_i$ with the electric energy generation module $T_i$ being in the power generating state and the residual fuel amount being smaller than some set threshold value as the second target energy sources.

Further, all the energy sources $S_i$ may be sequenced and numbered based on the state information.

The number range of the first target energy sources is defined from 1 to n, the n first target energy sources may be arranged in any sequence, and description will be made below according to the SOC value of the energy storage module $B_h$ from large to small in sequencing number. The number range of the second target energy sources is defined from n+1 to n+m, the m second target energy sources are sequenced and numbered according to the SOC value of the energy storage module $B_i$ from large to small. Residual N−(n+m) energy sources are defined, i.e., p energy sources, and the numbering range of the energy sources that do not output electric energy to the current load is n+m+1 to N, which may be numbered in any sequence.

The re-numbered N energy sources are $S_1, S_2 \ldots, S_n$, $S_{(n+1)} \ldots S_{(n+m)}, S_{(n+m+1)} \ldots S_N$, and the electric energy generation modules and the energy storage modules corresponding thereto are numbered identically. It is to be noted that it is unnecessary to re-sequence and number of the energy sources, and it is just for the convenience of differentiation herein.

S520, based on the classification result in the S510, the total output power $P_{B(total)}$ of the energy storage module $B_i$ is determined.

First, after removing the power capable of being output by the electric energy generation module $T_h$ in the first target energy sources, the charging power still needed by the charged vehicle is calculated as $$P_{B(total)} = P_{load} - \Sigma P_{T_h},$$

wherein $\Sigma P_{T_h}$ is a sum of power output by the electric energy generation module $T_h$ in the first target energy sources.

In the embodiment, when the system is in a stable working condition, the output power $P_{T_i}$ of some specific electric energy generation module $T_i$ may change along with time and may be a constant value, too. The numerical value of the output power $P_{T_i}$ of each electric energy generation module $T_i$ may be same or different. For example, preferably, the prime motor of the electric energy generation module $T_i$ is the gas turbine, and the prime motors and the generators of all the electric energy generation modules $T_i$ are same in parameter. When the system is in the stable working condition and the electric energy generation modules $T_i$ are in the stable power generating states, the gas turbine works at the optimum working point, and the output power $P_{T_i}$ is constant and is the rated output power of the gas turbine. At the time, the output power $P_{T_i}$ of the electric energy generation module is equal to $P_T$, and $P_T$ is a constant, i.e., the rated output power of the gas turbine, for example, 15 kW (merely as an example). When the electric energy generation module $T_i$ is in the stopped state, the output power $P_{T_i}$ of the electric energy generation module $T_i$ is equal to 0.

S530, the specific output power $P_{Si}$ of each energy source $S_i$ is determined based on the total output power $P_{B(total)}$ of the energy storage module $B_i$. According to amplitude of $P_{B(total)}$, it is divided into three conditions.

First Condition:
if $P_{B(total)}$<0, it is illustrated that the external power demand is smaller than the output power of the electric energy generation module $T_h$ in the first target energy source, and under the condition, the surplus output power charges the energy storage module $B_h$ of the CS while the output power of the electric energy generation module $T_h$ meets the external power demanded power. A calculating formula of the output power $P_{Sh}$ of each first target energy source is:

$$P_{Sh}=k_h \times P_{load}/n, \text{ or}$$

$$P_{Sh}=k'_h \times P_{load}/n, \text{ or}$$

$$P_{Sh}=k''_h \times P_{load}/n$$

a determination method of $k_h$, $k'_h$ and $k''_h$ is calculated according to a logical algorithm in the flow 600 (below). According to the formula $P_{Si}=P_{Ti}+P_{Bi}$ above, the charging power $P_{Bh}$ of the energy storage module $B_h$ in the first target energy source may be calculated. In the state, in the second target energy source, the output powers of the electric energy generation module $T_i$ (stopped state) and the energy storage module $B_i$ are zero.

Second Condition:

If $0 \leq P_{B(total)} \leq \Sigma P_{Bh(max)}$, it is illustrated that n first target energy sources may meet the power demand of the load, and it is necessary to output power to the load simultaneously by the electric energy generation module $T_h$ and the energy storage module $B_h$ of the first target energy source. At the time, in the second target energy source, the output powers of the electric energy generation module $T_i$ (stopped state) and the energy storage module $B_i$ are zero.

$\Sigma P_{Bh(max)}$ is the maximum allowed power value capable of being output by the energy storage module $B_h$ in the first target energy source; when the energy storage module $B_h$ is preferably the storage battery, the maximum allowed power value is affected by SOC of the current battery, battery and environment temperature, humidity and the like; in addition, in order to meet the external charging demand continuously in the whole system, the maximum allowed power $P_{Bh(max)}$ value capable of being output by the energy storage module $B_h$ in the first target energy source is limited correspondingly, which may be realized by a calibration look-up table. The output power $P_{Sh}$ of the first target energy source is determined according to the following steps:

A, a discharge coefficient $b_{h(discharge)}$ of the energy storage module $B_h$ in each first target energy source is $k_h$, $k'_h$ and $k''_h$ (the determination method of $k_h$, $k'_h$ and $k''_h$ is calculated by the logical algorithm in the 600), that is:

$$b_{h(discharge)}=k_h \text{ or}$$

$$b_{h(discharge)}=k'_h \text{ or}$$

$$b_{h(discharge)}=k''_h$$

B, a calculating formula of the discharge power $P_{Bh}$ of the energy storage module $B_h$ is:

$$P_{Bh}=b_{h(discharge)} \times P_{B(total)}/n$$

C, the output power $P_{Sh}$ of the first target energy source is determined.

$$P_{Sh}=P_{Bh}+P_{Th}$$

Third condition:

if $P_{B(total)} > P_{Bh(max)}$, it is illustrated that n first target energy sources may not meet the power demand of the load, and it is necessary to supplement the m second target energy sources. It includes the following steps:

A, the output powers $P_{Sh}$ of the n first target energy sources are determined. At the time, the electric energy generation module $T_h$ of the first target energy source outputs power according to the optimum power point, and the energy storage module $B_h$ of the first target energy source outputs power according to the maximum allowed power value $P_{Bh(max)}$ capable of bing output, that is:

$$P_{Sh}=P_{Th}+P_{Bh(max)}$$

B, the output powers $P_{Si}$ of the m first target energy sources are calculated. At the time, in the second target energy source, the output powers of the electric energy generation module $T_i$ (stopped state) is zero, and the output power of the energy storage module $B_i$ in the second target energy source is distributed below.

B1: the total output power $\Sigma P_{Sh}$, $\Sigma P_{Sh}=\Sigma P_{T_h}+\Sigma P_{Bh(max)}$ of the n first target energy sources is calculated;

B2, the surplus power is distributed according to $P_{load}-\Sigma P_{Sh}$, and the output power of each second target energy source is as follows.

$$P_{Si} = (k_i, \text{ or } k'_j, \text{ or } k''_j) \times \frac{P_{load} - \sum P_{Sh}}{m}$$

Figure 11:
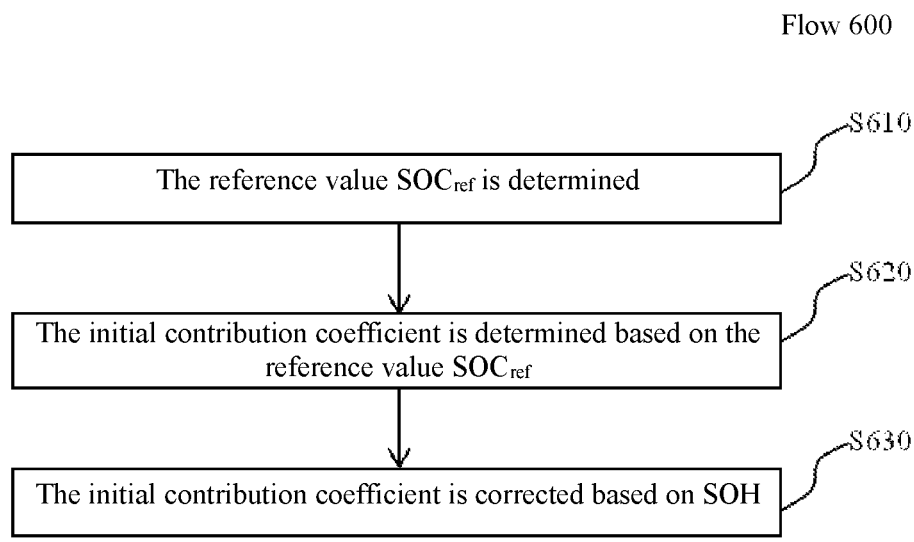
FIG. 11 is a flow diagram of a contribution coefficient determination method in the embodiment of the present invention.

Referring to FIG. 11, it shows a contribution coefficient determination flow 600: the method for determining the contribution coefficients $k_h$, $k'_h$, $k''_h$ and $k_i$, $k'_j$, $k''_j$ includes:

S610, for the contribution coefficient $k_h$, a reference value $SOC_{href}$ is determined, and a calculating formula of the reference value $SOC_{href}$ is $SOC_{href}=\Sigma SOC_h/n$;

for the contribution coefficient $k_i$, a reference value $SOC_{iref}$ is determined, and a calculating formula of the reference value $SOC_{iref}$ is:

$$SOC_{jref}=\Sigma SOC_j/M;$$

S620, the contribution coefficient $k_h$ is calculated, $$k_h = 1 + \frac{SOC_h - SOC_{href}}{SOC_{hmax} - SOC_{hmin}}$$

and the contribution coefficient $k_i$ is calculated;

$$k_i = 1 + \frac{SOC_i - SOC_{iref}}{SOC_{imax} - SOC_{imin}}$$

S630, $k_h$ and $k_j$ are corrected based on SOH value.

S631, first round correction: $k'_h=k_h \times SOH_h$, $k'_i=k_i \times SOH_i$; correction considers influence of the SOH value on charging and discharging capacities of the energy storage module so as to ensure the service life of the energy storage module.

S632, second round correction: $k''_h=k'_h \times n/\Sigma k'_h$, $k''_i=k'_i \times m/\Sigma k'_i$; correction is to ensure $\Sigma k''_h=n$, $k''_i=m$ to meet the power demand of the load to the greatest extent, and meanwhile avoid a condition that the output power of the system is smaller than the load power demand.

The correction operations are not a must, and the correction operations only act under $\Sigma k'_h > nn$, $\Sigma k'_i > m$.

The embodiment considers influence of the operating state of the electric energy generation module and the electric quantity state of the energy storage module on a distribution policy comprehensively. The power distribution method of the embodiment may reduce frequency start-stop of the electric energy generation module under the condition of meeting the power requirement of the load as much as possible to prolong the service life o the electric energy generation module and reduce the energy loss caused by frequency start-stop of the electric energy generation module, and meanwhile, it is ensured that the energy storage module is used in a balanced manner, so that the service life of the battery is prolonged.

The embodiments of the present invention further provide another power distribution method. Different from the embodiment of the power distribution method, the embodiment is used in the CS based on parallel connection of more than two energy sources $S_i$, wherein each energy source $S_i$ includes an electric energy generation module $T_i$, and the plurality of energy sources $S_i$ share one energy storage module B. In the embodiment, the power of the load is distributed by the following steps: when the plurality of energy sources $S_i$ of the CS share one energy storage module B, the energy storage module B does not take part in outputting electric energy to the load, and is only responsible to provide starting electric energy to the electric energy generation module $T_i$ in the energy source $S_i$ of the CS, so that it is unnecessary to consider the power of the energy storage module B when the load power is distributed. At the time, the state information of the energy source $S_i$ is the operating state information of the electric energy generation module $T_i$. The operating state information of the electric energy generation module $T_i$ indicates that the current operating condition of the electric energy generation module $T_i$ may be shutdown (halt, stop) state, standby state, power generating state, fault state and the like, and may further be some information that indicates performance state of the electric energy generation module $T_i$, for example, data of production, residual fuel amount and the like of the electric energy generation module $T_i$. At the time, it is merely necessary to determine which the energy source $S_i$ is selected to output power $P_{Si}$ to the load according to the operating state information of the electric energy generation module $T_i$, and the output power of the energy source $S_i$ is the output power $P_{Ti}$ when the electric energy generation module $T_i$ operates stably. For example, by taking the surplus fuel amount as a screening standard, energy sources $S_i$ with relative great surplus fuel amount may be selected to output power $P_{Si}$ to the load, and for further example, the energy sources $S_i$ in the standby state are preferably selected to output power $P_{Si}$ to the load.

In the embodiment, when the system is in a stable working condition, the output power $P_{Ti}$ of some specific electric energy generation module $T_i$ may change along with time and may be a constant value, too. The numerical value of the output power $P_{Ti}$ of each electric energy generation module $T_i$ may be same or different. For example, preferably, the prime motor of the electric energy generation module $T_i$ is the gas turbine, and the prime motors and the generators of all the electric energy generation modules $T_i$ are same in parameter. When the system is in the stable working condition and the electric energy generation modules $T_i$ are in the stable power generating states, the gas turbine works at the optimum working point, and the output power $P_{Ti}$ is constant and is the rated output power of the gas turbine. At the time, the output power $P_{Ti}$ of the electric energy generation module is equal to $P'_T$, and $P_T$ is a constant, i.e., the rated output power of the gas turbine, for example, 15 kW (merely as an example). When the electric energy generation module $T_i$ is in the stopped state, the output power $P_{Ti}$ of the electric energy generation module $T_i$ is equal to 0.

The embodiment considers influence of the operating state of the electric energy generation module on a distribution policy comprehensively. The power distribution method of the embodiment may reduce frequency start-stop of the electric energy generation module under the condition of meeting the power requirement of the load as much as possible to prolong the service life o the electric energy generation module and reduce the energy loss caused by frequency start-stop of the electric energy generation module.

The embodiments of the present invention further provide a multi-mode charging method. In the charging system, when a single energy source is used to charge the load, it is necessary to determine the output power $P_{Si}$ of the single energy source based on the real-time power demand of the load; when a plurality of energy sources are used to charge the external load, it is necessary to distribute the output power task to each energy source to meet the real-time power demand of the load according to difference among the output capacities of the energy sources based on the real-time power demand of the load, i.e., the output power $P_{Si}$ of each energy source is determined. When the plurality of energy sources are used to charge the external load, the load demanded power distribution method refers to the flows 400, 500 and 600 specifically. In the energy source formed by two electric quantity sources: the electric energy generation module and the energy storage module, after the output power $P_{Si}$ of the energy source is determined, it is further necessary to determine the working mode in the energy source. The multi-mode charging method of the embodiment refers to further determine the working modes of the two electric quantity sources: the electric energy generation module and the energy storage module in the energy source based on the output power $P_{Si}$ distributed by the energy source. It is to be understood that although the charging system shown in FIG. 1 and FIG. 2 include the plurality of energy sources, the multi-mode charging method is also suitable for a condition of a single energy source.

Figure 12:
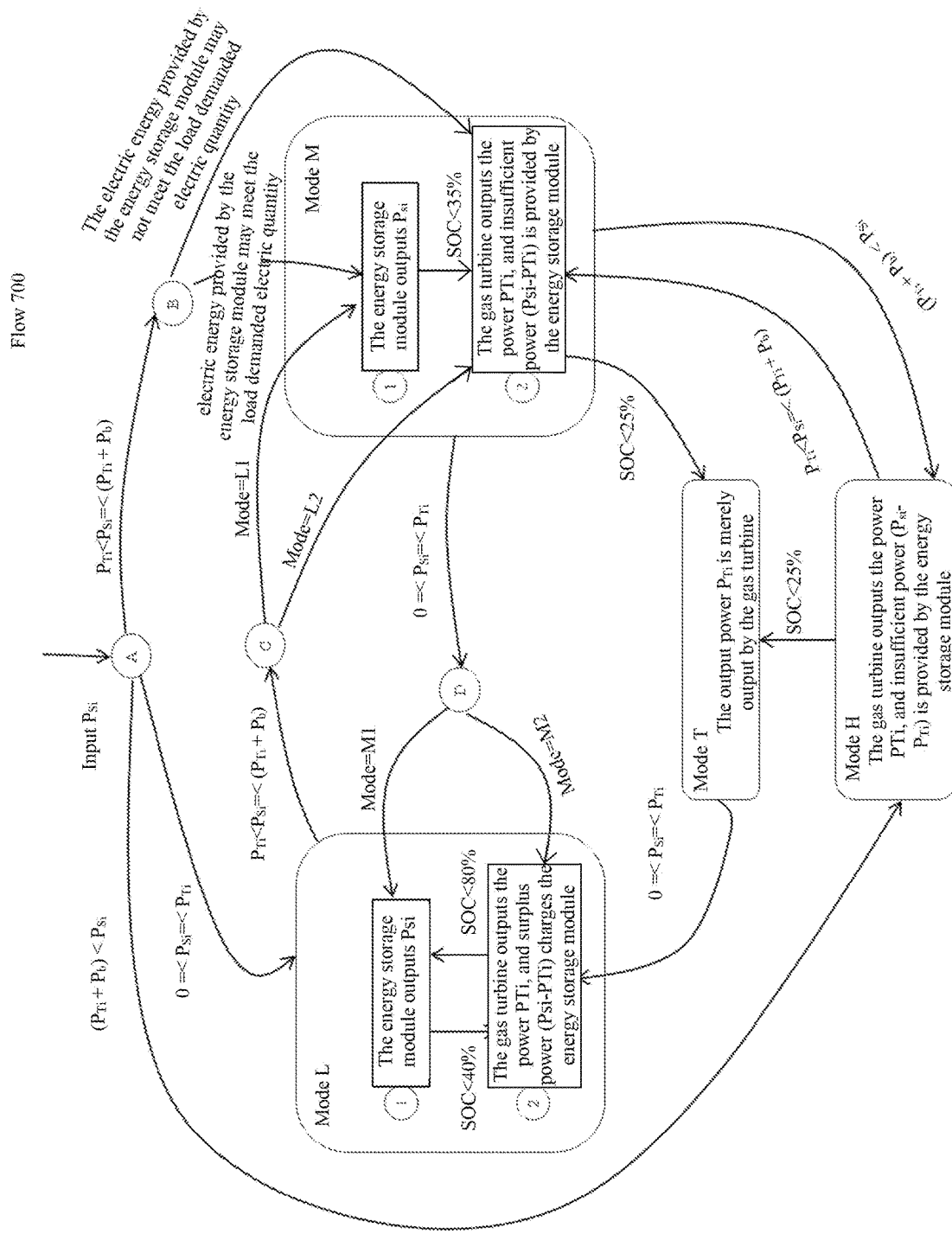
FIG. 12 is a flow diagram of a multi-mode charging method in the embodiment of the present invention.

Referring to FIG. 12, it is a schematic diagram of an embodiment of the multi-mode charging method provided by the present invention.

In the embodiment, each energy source $S_i$ includes an electric energy generation module $T_i$ (preferably the power generation unit of the gas turbine, i.e., gas turbine+generator, power generation devices in any form capable of generating electric energy) and an energy storage module $B_i$ (preferably a storage battery, electric energy storage devices capable of being charged and discharged in any form).

The multi-mode charging flow 700 includes:
the operating mode of each energy source $S_i$ is divided into four modes: a low power mode (L mode), a medium power mode (M mode), a high power mode (H mode) and an independent operating mode (T mode) of an electric energy generation module. The L mode and the M mode are further divided into L1, L2 and M1 and M2 modes respectively. (Detailed description is seen in FIG. 4).

$EMS_i$ receives the output power $P_{Si}$ sent by the HCU and determines an initial working mode of the energy source $S_i$ based on the amplitude of the output power $P_{Si}$:
if $0 \leq P_{Si} \leq P_{Ti}$, it is determined that the energy source $S_i$ enters the mode L to operate, wherein $P_{Ti}$ is the output power when the electric energy generation module $T_i$ works at the optimum working point. In the embodiment, when the system is in a stable working condition, the output power $P_{Ti}$ of some specific electric energy generation module $T_i$ may change along with time and may be a constant value, too. The numerical value of the output power $P_{Ti}$ of each electric energy generation module $T_i$ may be same or different. For example, preferably, the prime motor of the electric energy generation module $T_i$ is the gas turbine, and the prime motors and the generators of all the electric energy generation modules $T_i$ are same in parameter. When the system is in the stable working condition and the electric energy generation modules $T_i$ are in the stable power generating states, the gas turbine works at the optimum working point, and the output power $P_{T_i}$ is constant and is the rated output power of the gas turbine. At the time, the output power $P_{T_i}$ of the electric energy generation module is equal to $P_T$, and $P_T$ is a constant, i.e., the rated output power of the gas turbine, for example, 15 kW (merely as an example). When the electric energy generation module $T_i$ is in the stopped state, the output power $P_{T_{i1}}$ of the electric energy generation module $T_i$ is equal to 0.

After entering the mode L, the energy source $S_i$ operates in the mode L1 in a default manner. In the mode L2, the energy storage module $B_i$ meets the power $P_{Si}$ independently. It is because that when it is necessary that the power $P_{Si}$ output by the energy source $S_i$ is relatively small, the energy storage module $B_i$ in the energy source $S_i$ may meet the demand generally without starting the electric energy generation module $T_i$ in the energy source $B_i$.

The energy source $S_i$ operates in the mode L1 in a default manner. When the SOC value of the energy storage module $B_i$ is lower than a first threshold value (for example 40%, which may be calibrated; the SOC value is lower than the first threshold value to show that the surplus electric quantity of the energy storage module $B_i$ is insufficient), it enters the mode L2, and the electric energy generation module $T_i$ is started. It operates in the mode L2. When the output power $P_{Ti}$ of the electric energy generation module $T_i$ (for example, 15 kW, 45 kW and 60 kW, associated with models of gas turbines) meets the condition $P_{Si}$, the surplus power ($P_{Si}-P_{TL}$) charges the energy storage module B. In the process that the output power $P_{Ti}$ of the electric energy generation module $T_i$ charges the energy storage module $B_i$, the SOC value of the energy storage module $B_i$ is increased continuously. When it is detected that the SOC value of the energy storage module $B_i$ is greater than or equal to a second threshold value (for example 80%, which may be calibrated; the SOC value is greater than or equal to the second threshold value to show that the energy storage module has sufficient electric quantities to be output externally), the electric energy generation module $T_i$ is closed, and it is returned to the mode L1 to operate, i.e., the energy storage module $B_i$ meets the power $P_{Si}$ independently.

In the embodiment, the output power $P_{Si}$: $P_{Si}=P_{Ti}+P_{Bi}$ of each energy source $S_i$ module is defined, wherein $P_{Ti}$ is output power of the electric energy generation module $T_i$, and value of $P_{Ti}$ is greater than or equal to 0. $P_{Bi}$ is output power of the electric energy generation module $B_i$, and value of $P_{Bi}$ may be greater than or equal to 0 and may be smaller than 0. When the value of $P_{Bi}$ is greater than 0, it shows that the energy storage module $B_i$ is in a discharging state, i.e., the electric energy is output to the load; when the value of $P_{Bi}$ is smaller than 0, it shows that the energy storage module $B_i$ is in a charging state, besides electric energy output to the load by $P_{Ti}$, the energy storage module $B_i$ is charged by surplus electric energy.

If $P_{Ti}<P_{Si}\leq(P_{Ti}+P_i)$, it is determined that the energy source enters the mode M to operate. $P_b$ is a set power which is related to a parameter of the energy storage module B. For example, $P_b$ may be discharging power correspondingly when the discharging rate of the energy storage module $B_i$ is 1 C.

After entering the mode M, whether it operates in the mode M1 or M2 or not may be judged by two methods:

First, the energy source $S_i$ operates in the mode M1 in a default manner, and in the mode M1, the energy storage module $B_i$ meets the power $P_{Si}$ independently.

When the SOC value is lower than a third threshold value (for example 35%, which may be calibrated), it enters the mode M2: the electric energy generation module $T_i$ is started. In the mode M2, the electric energy generation module $T_i$ outputs the power $P_{Ti}$ (for example 15 kW, 45 kW and 60 kW, which is related to the model of the electric energy generation module $T_i$), and meanwhile, the output power of the energy storage module $B_i$ is ($P_{Si}-P_{Ti}$).

Second, if the electric quantity provided by the energy storage module $B_i$ meets the required electric quantity of the load, it enters the mode M1, and otherwise, it enters the mode M2. A condition to judge that it enters the mode M1 is as follows:

$$C_{load-demand} \leq C_{B1}$$

$C_{load-demand}$ is the required electric quantity of the load and $C_{B1}$ is electric quantity provided by the energy storage module $B_i$, and the two variables are calculated below respectively:

$$C_{load-demand}=C_{load-total}\times(SOC_{demand}-SOC_{load})$$

$C_{load-total}$ is a total capacity of the load, $SOC_{demand}$ is the SOC value expected to meet finally by the load, which may be a default value (for example 90%) set as a rule of thumb or a numerical value input by a user, and $SOC_{load}$ is the SOC value of the load.

$$C_{B1}=C_{B-total}\times(SOC_B-SOC_{lim1})$$

$C_{B1}$ is electric quantity provided by the energy storage module; $C_{B-total}$ is the total capacity of the energy storage module, $SOC_B$ is a current SOC value of the energy storage module, $SOC_{lim1}$ is a first limit value of the energy storage module, and when $SOC_B$ of the energy storage module is smaller than the first limit value, the mode M1 is converted into the mode M2.

If $(P_{Ti}+P_i)<P_{Si}$, it is determined that the energy source enters the mode H to operate.

In the mode H, the electric energy generation module $T_i$ outputs the power $P_{Ti}$ (for example 15 kW, 45 kW and 60 kW, which is related to the model of the electric energy generation module $T_i$), and meanwhile, the output power of the energy storage module $B_i$ is ($P_{Si}-P_{Ti}$).

In the charging process, along with change (increase or decrease) of $P_{Si}$, the energy source $S_i$ may be switched automatically in four operating modes (modes L, M, H and T), i.e., the energy source $S_i$ may update the working mode (or the determined new working mode) based on change of the initial working mode (current working mode) and $P_{Si}$ to better track the output power $P_{Si}$.

The mode L is switched to the mode M:
when the energy source $S_i$ works in the mode L and $P_{Ti}<P_{Si}\leq(P_{Ti}+P_i)$ is detected, it is switched to the mode M automatically. Whether it is switched to the mode M1 or the mode M2 needs to be further judged; if the current operating mode of the energy source $S_i$ is L1, i.e., $Mode_{current}$=L1, it is switched to the mode M1, i.e., $Mode_{updated}$=M1; if the current operating mode of the energy source $S_i$ is L2, i.e., $Mode_{current}$=L2, it is switched to the mode M2, i.e., $Mode_{updated}$=M2. The beneficial effect, by switching the mode L1 to the mode M1 and switching the mode L2 to the mode M2, is that the energy source $S_i$ outputs energy more gently, start-stop operations of the electric energy generation module $T_i$ are reduced, and the system loss is reduced and the efficiency is improved while the electric energy generation module $T_i$ is protected. Otherwise, assuming that the mode L1 is switched to the mode M2, it is necessary to start the electric energy generation module $T_i$, and the mode L2 is switched to the mode M1, it is necessary to close the electric energy generation module $T_i$.

The mode M is switched to the mode L:

when the energy source works in the mode M and $0 \leq P_{Si} \leq P_{Ti}$ is detected, it is switched to the mode L automatically. Whether it is switched to the mode L1 or the mode L2 needs to be further judged; if the current operating mode of the energy source $S_i$ is M1, i.e., $Mode_{current}$=M1, it is switched to the mode L1, i.e., $Mode_{updated}$=; if the current operating mode of the energy source $S_i$ is M2, i.e., $Mode_{current}$=M2, it is switched to the mode L2, i.e., $Mode_{updated}$=L2.

The mode M is switched to the mode H:

when the energy source $S_i$ works in the mode L and $(P_{Ti}+P_i)<P_{Si}$ is detected, it is switched to the mode H automatically.

The mode H is switched to the mode M2:

when the energy source $S_i$ works in the mode H and $P_{Ti}<P_{Si}\leq(P_{Ti}+P_i)$ is detected, it is switched to the mode M2 automatically.

The mode H/M2 is switched to the mode T:

when the energy source $S_i$ operates in the mode H or the mode M2 and the SOC value of the energy storage module $B_i$ is smaller than a fourth threshold value (for example 25%, which may be calibrated), the energy source $S_i$ is switched to the mode T automatically. When the SOC value of the energy storage module $B_i$ is very small, further discharge will cause certain damage to the energy storage module $B_i$.

The mode T is switched to the mode L2:

when the energy source works in the mode T, along with charging proceeded, $P_{Si}$ is reduced; when $P_{Si}$ is decreased to meet a condition $0 \leq P_{Si} \leq P_{Ti}$, the energy source is switched from the mode T to the mode L2, i.e., besides the power output by the electric energy generation module $T_i$ meets $P_{Si}$, the surplus power $(P_{Si}-P_{TL})$ is configured to charge the energy storage module $B_i$.

According to the multi-mode charging method provided by the embodiment of the present invention, the energy source may be switched automatically in the plurality of working modes, so that the energy source may track the constantly changing power requirement of the load accurately. By arranging an inter-working mode switching condition, the energy source outputs energy more gently, start-stop operations of the electric energy generation module are reduced, and the system loss is reduced and the efficiency is improved while the electric energy generation module is protected.

The embodiments of the present invention further provide an electricity compensating method for an energy storage module to ensure that the charged energy storage module has an expected electric quantity.

Figure 13:
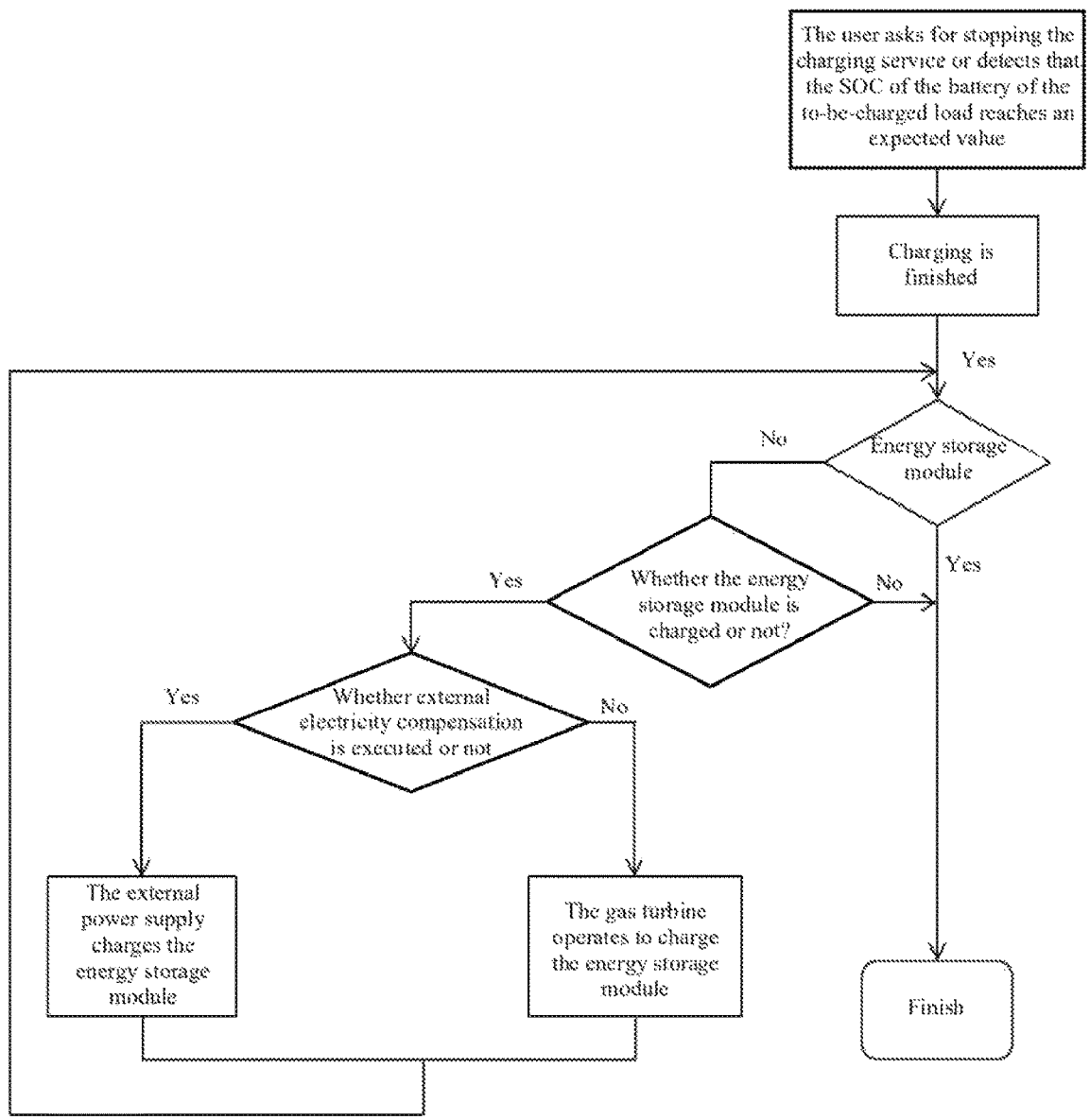
FIG. 13 is a flow diagram of electricity compensation in an energy storage module in the embodiment of the present invention.

Referring to FIG. 13, an electricity compensating flow 800 of the energy storage module includes:

in a charging process, when a user requires to stop a charging service (for example, the user clicks "charge over" on an app interface of a mobile phone) or detects that the SOC of the power battery of the to-be-charged load is greater than some expected value (for example 90%), it is executed according to the flow shown in FIG. 13. Specifically, after charging, the SOC value of the energy storage module is judged first. When the SOC value thereof is greater than or equal to 85% (the value may be set according to an actual condition), whether the energy storage module needs to be charged or not is determined; otherwise, whether the energy storage module needs to be charged is determined. When it is needed to charge the energy storage module, whether external electricity compensation is executed or not is determined. When external electricity compensation is executed, the external power supply compensates the energy storage module with electricity. When external electricity compensation is not needed, the energy storage module is compensated with electricity as the gas turbine operates.

The above description is merely description of preferred embodiments of the application and applied technical principles. Those skilled in the art shall understand that the scope of the application in the present invention is not limited to the technical scheme specifically combined by the technical characteristics and shall cover other technical schemes formed by combining the technical characteristics or equivalent characteristics thereof without departing the concept of the present invention. For example, the characteristics have similar functions with those disclosed (but not limited to) in the application.

What is claimed is:

1. A bearing detection method for supporting fault detection of an air bearing or a mixed bearing formed by the air bearing and a magnetic bearing of a rotor when the rotor is started, comprising:

starting the rotor to allow the rotor to rotate at a first rotating speed along a first direction, wherein the first direction is a rotating direction when the rotor operates normally, and the first rotating speed is a first calibration value;

acquiring a first torque, wherein the first torque is an output torque when the rotor rotates at the first rotating speed along the first direction; and judging the first torque and a torque threshold value, wherein the torque threshold value is a second calibration value, and when the first torque is smaller than the torque threshold value, the air bearing or the mixed bearing is fault-free, wherein a further detection is performed on the bearing when the first torque and the torque threshold value are judged and the first torque is greater than or equal to the torque threshold value, wherein the further detection comprises the following steps:

controlling the rotor to reverse to allow the rotor to rotate at a second rotating speed along a second direction, wherein the second direction is a direction contrary to the first direction, and the second rotating speed is a third calibration value;

acquiring a reversing time, wherein the reversing time is a duration from a first moment when the rotor is reversed to a second moment when the rotor rotates at the second rotating speed along the second direction; and judging the reversing time and a reversing time threshold value, wherein the reversing time threshold value is a fourth calibration value, and when the reversing time is greater than or equal to the reversing time threshold value, the air bearing or the mixed bearing has a fault.

2. The bearing detection method according to claim 1, wherein a method for controlling the rotor to reverse to enable the rotor to rotate at the second rotating speed along the second direction comprises: reducing a speed of the rotor to zero first and then controlling the rotor to rotate reversely to raise the speed to the second rotating speed.

3. A bearing detection method for supporting fault detection of an air bearing or a mixed bearing formed by the air bearing and a magnetic bearing of a rotor when the rotor is started, comprising:

starting the rotor to allow the rotor to rotate at a first rotating speed along a first direction, wherein the first direction is a rotating direction when the rotor operates normally, and the first rotating speed is a first calibration value;

acquiring a first torque, wherein the first torque is an output torque when the rotor rotates at the first rotating speed along the first direction; and judging the first torque and a torque threshold value, wherein the torque threshold value is a second calibration value, and when the first torque is smaller than the torque threshold value, the air bearing or the mixed bearing is fault-free, wherein a further detection is performed on the air bearing or the mixed bearing when the first torque and the torque threshold value are judged and the first torque is greater than or equal to the torque threshold value, wherein the further detection comprises the following steps:

controlling the rotor to reverse to allow the rotor to rotate at a second rotating speed along a second direction, wherein the second direction is a direction contrary to the first direction, and the second rotating speed is a third calibration value;

acquiring a second torque, wherein the second torque is an output torque when the rotor rotates at the second rotating speed along the second direction; and judging the second torque and a torque threshold value, wherein the torque threshold value is the second calibration value, and when the second torque is greater than or equal to the torque threshold value, the air bearing or the mixed bearing has a fault.

4. The bearing detection method according to claim 3, wherein a method for acquiring the first torque and the second torque comprises: determining an output torque $t_1$ of the rotor based on voltage and current values fed back when the rotor is a motor rotor:

$$t_1 = P_{mechanical}/\omega \qquad (1)$$

$$P_{mechanical} \approx P_{electrical} = 3 U_{phase} \times I_{phase} \text{ or}$$
$$P_{mechanical} \approx P_{electrical} = 3 U_{phase} \times I_{phase} = \sqrt{3} U_{line} \times I_{line} \qquad (2),$$

wherein $P_{mechanical}$ is mechanical power output by the rotor, $P_{electrical}$ is an electric power of the motor, $\omega$ is an angular speed and a phase current $I_{phase}$ is equal to a linear current $I_{line}$.

5. The bearing detection method according to claim 3, wherein a method for acquiring the first torque and the second torque comprises: determining an output torque $t_1$ of the rotor based on voltage and current values fed back when the rotor is a motor rotor:

$$t_1 = P_{mechanical}/\omega \qquad (1)$$

$$P_{mechanical} = \eta P_{electrical} = \eta \times 3 U_{phase} \times I_{phase} \text{ or}$$
$$P_{mechanical} = \eta P_{electrical} = \eta \times \sqrt{3} U_{line} \times I_{line} \qquad (3)$$

wherein $P_{mechanical}$ is mechanical power output by the rotor, $P_{electrical}$ is an electric power of the motor, $\omega$ is an angular speed, a phase current $I_{phase}$ is equal to a linear current $I_{line}$, and $\eta$ is efficiency of converting electric energy of the motor into mechanical energy, an estimated value.

6. The bearing detection method according to claim 3, wherein a method for controlling the rotor to reverse to enable the rotor to rotate at the second rotating speed along the second direction comprises: reducing a speed of the rotor to zero first and then controlling the rotor to rotate reversely to raise the speed to the second rotating speed.

7. A starting method for starting a gas turbine, wherein the gas turbine uses an air bearing or a mixed bearing formed by the air bearing and a magnetic bearing, wherein the method comprises: detecting whether the air bearing or the mixed bearing has a fault or not by using a bearing detection method when the gas turbine is started, wherein the bearing detection method is for supporting fault detection of the air bearing or the mixed bearing formed by the air bearing and the magnetic bearing, which is of a rotor when the rotor is started, the bearing detection method including:

starting the rotor to allow the rotor to rotate at a first rotating speed along a first direction, wherein the first direction is a rotating direction when the rotor operates normally, and the first rotating speed is a first calibration value;

acquiring a first torque, wherein the first torque is an output torque when the rotor rotates at the first rotating speed along the first direction; and judging the first torque and a torque threshold value, wherein the torque threshold value is a second calibration value, and when the first torque is smaller than the torque threshold value, the air bearing or the mixed bearing is fault-free, wherein the starting method further comprises:

when the air bearing or the mixed bearing is fault-free, entering a speed-raising stage of the gas turbine; and when the air bearing or the mixed bearing has the fault, reporting the fault, and shutting down the gas turbine.

* * * * *